United States Patent [19]

Sheehan et al.

[11] Patent Number: 5,889,524
[45] Date of Patent: Mar. 30, 1999

[54] RECONSTRUCTION OF THREE-DIMENSIONAL OBJECTS USING LABELED PIECEWISE SMOOTH SUBDIVISION SURFACES

[75] Inventors: Florence H. Sheehan, Mercer Island; John A. McDonald, Seattle; Edward L. Bolson, Redmond, all of Wash.; Malcolm E. Legget, Remeura, New Zealand

[73] Assignee: University of Washington, Seattle, Wash.

[21] Appl. No.: 709,577

[22] Filed: Sep. 9, 1996

Related U.S. Application Data

[60] Provisional application No. 60/003,684 Sep. 11, 1995.

[51] Int. Cl.[6] ................................................ G06T 17/00
[52] U.S. Cl. ............................................................. 345/419
[58] Field of Search .................................... 345/419, 423; 600/416; 382/128

[56] References Cited

U.S. PATENT DOCUMENTS

| 4,365,339 | 12/1982 | Pavkovich et al. | 378/15 |
|---|---|---|---|
| 5,243,665 | 9/1993 | Maney et al. | 382/8 |
| 5,257,346 | 10/1993 | Hanson | 395/125 |
| 5,273,038 | 12/1993 | Beavin | 128/653.1 |
| 5,273,433 | 12/1993 | Haines et al. | 359/9 |
| 5,689,577 | 11/1997 | Arata | 382/128 |

OTHER PUBLICATIONS

Hoppe et al., "Surface Reconstruction from Unorganized Points," Computer Graphics, vol. 26, No. 2, Jul. 1992, 8pp.
Hoppe et al., "Mesh Optimization," Computer Graphics Proceedings, Annual Conference Series, 1993, pp. 19–26.
Hoppe et al., "Piecewise Smooth Surface Reconstruction," Computer Graphics Proceedings, Annual Conference Series, 1994, pp. 295–302.

*Primary Examiner*—Mark R. Powell
*Assistant Examiner*—Alford W. Kindred
*Attorney, Agent, or Firm*—Ronald M. Anderson

[57] ABSTRACT

A method is disclosed for reconstructing a surface of an object using three-dimensional imaging data. While the method can be applied to reconstruct the surface of almost any object represented by three-dimensional data obtained by some imaging modality, an example of the technique is disclosed that reconstructs the surface of a left ventricle. In the disclosed example, digital imaging data for a patient's heart are traced producing a data set of points that define the border and specific anatomic features of the left ventricle. An abstract model of a generalized left ventricle is generated that fits a wide range of sizes and shapes of this portion of the heart. The abstract model includes an abstract control mesh in which the anatomic features are labeled and sharp (edge) characteristics are identified. Coordinates are assigned to the abstract control mesh, producing an initial embedded mesh, which is then subdivided twice to increase its smoothness. The embedded subdivided mesh is rigidly aligned with the data set points of the patient's left ventricle, and in particular, with the anatomic features. Finally, the aligned subdivided mesh is optimally fit to the data set points and anatomic features, yielding the reconstructed surface of the organ. The reconstruction of a surface using medical imaging data is a particularly good exemplary application of the invention, because it shows that the method can be employed for reconstructing the surface of any three-dimensional object that is defined by relatively sparse and noisy data points.

21 Claims, 14 Drawing Sheets

RECONSTRUCTION OF THREE-DIMENSIONAL OBJECTS USING LABELED PIECEWISE SMOOTH SUBDIVISION SURFACES

This invention was made with government support under Contract HL 41464 awarded by the National Institutes of Health, and was also supported by the National Science Foundation under Contracts DMS-9103002 and DMS-9402734. The government has certain rights in the invention.

This application is a continuation-in-part patent application, based on prior copending provisional application Ser. No. 60/003,684, filed Sep. 11, 1995, the benefit of the filing date of which is hereby claimed under 35 U.S.C. §§ 9(e) and 120.

FIELD OF THE INVENTION

This invention generally relates to a method for imaging and modeling an object in three dimensions, and more specifically, to a method for using data representing a three-dimensional model of the object to reconstruct its surface.

BACKGROUND OF THE INVENTION

Reconstructing the surface of a three-dimensional object can provide information useful for a variety of applications such as generating computer aided design models from physical objects, or outlining biological structures or organs. From the reconstructions, a variety of measurements can be made of the object's dimensions and shape, for example, for use in product development or in scientific investigation. Alternatively, the reconstructions can be used to guide the manufacturing of facsimiles of the object.

A number of reconstruction algorithms have been developed. They fit into two main types. Implicit reconstruction methods attempt to find a smooth function whose value approaches zero when the reconstructed surface fits the input data points most closely. These methods differ in the form of the function, and in the measure of closeness of fit. The disadvantage of this approach is the risk that spurious surface components not supported by the data may be generated. A second type of reconstruction algorithm uses parametric techniques. Parametric reconstruction techniques represent a reconstructed surface as a topological embedding function of a two-dimensional parameter domain into a three-dimensional surface. Previous work has concentrated on domain spaces with simple topology, e.g., the plane and the sphere. This simplification of the problem may have the disadvantage of constraining shapes into variants of a geometric figure, making it difficult to fit a modeled surface to more complex shapes.

Regardless of type, reconstruction algorithms are generally developed to address specific problems. They make use of, and hence assume, a partial structure in the data. For example, algorithms that reconstruct a surface from contours generated by slicing the object and stacking the outlines of the object from the slices depend on the fact that the data are organized into closed polygons lying in parallel planes. Attempting to reconstruct a surface without prior assumptions regarding the spatial relationships of the data points derived from that surface has a practical advantage in that the algorithm employed is general purpose and widely applicable. One method that does not make any assumption concerning the structure of the data points is described in a paper entitled "Surface Reconstruction from Unorganized Points" by Hughes Hoppe, Tony DeRose, Tom Duchamp, John McDonald, and Werner Stuetzle (*Computer Graphics*, 26, Jul. 2, 1992). A subsequent report by these authors describes a modification of their reconstruction algorithm to achieve "Mesh Optimization" (*Computer Graphics Proceedings*, Annual Conference Series, 1993) in which the reconstruction surface is represented by a small number of vertices without losing shape fidelity. A third report, "Piecewise Smooth Surface Reconstruction" by Hughes Hoppe, Tony DeRose, Tom Duchamp, Mark Halstead, Hubert Jin, John McDonald, Jean Schweitzer, and Werner Stuetzle (*Computer Graphics Proceedings*, Annual Conference Series, 1994) describes further modification of the reconstruction method for unorganized points in which the surface can be represented in terms of piecewise smooth surface models. This improvement allows the modeling of surfaces of arbitrary topological type, with recovery of sharp features such as creases and corners.

The approach of Hoppe et al. has been successful for input point data sets, which include points that are densely and evenly sampled and are thus extremely accurate, e.g., data sets produced by laser scanners. However, such high quality data are not always available. For example, in medical imaging, the number of data points may be limited by procedural risk to the patient from radiation exposure, the time required to obtain the images, the resolution of the imaging equipment, or by restrictions on computer memory or required processing speed. For such applications, the ability to generate surface reconstructions with high spatial shape fidelity from sparse data would be useful, but a method to achieve this result is not disclosed in the prior art.

Another limitation of currently available reconstruction algorithms is the generality of the description. Both implicit and parametric approaches generate a global description of the three-dimensional surface, the representation that best fits all of the input point data. However, in some applications, it would be useful to identify the part of the reconstruction that corresponds to a particular subset of input data points. For example, in processing data from images of a human face, it may be useful to designate a subset of input data points as corresponding to an anatomic feature such as a mouth, and to be able to locate the part of the completed reconstruction that was fit to that feature's data points. In addition, the ability to constrain the points corresponding to a feature to a certain part of the reconstruction would be useful. This capability would facilitate, for example, the comparison of a plurality of objects of the same class, by registering them spatially according to the selected features.

One application in medicine that would require these types of functionality in a reconstruction algorithm is reconstructing the surface of the heart. The heart is a complex three-dimensional organ normally having four chambers and four valves. Disease processes can affect any number of these chambers and valves, altering their structure and/or function. Measuring the size, shape, and function of the chambers and valves provides useful information that can assist a physician in evaluating the effect of disease processes, hemodynamic changes, and other influences on the heart. Such measurements may help in diagnosing cardiac problems in patients, evaluating the effect of treatment, assessing prognosis, and in understanding the underlying mechanisms of the disease process and its response to therapeutic interventions.

Most commonly, the left ventricle of the heart is investigated. The left ventricle is of greatest importance to health, because it pumps blood through the body. The right ventricle is also studied, because it provides the impetus for blood circulation through the lungs. One of the most commonly used parameters for diagnostic purposes is the ventricular chamber volume. Patients with diseased hearts may have an enlarged left ventricle, particularly at advanced stages of the disease. The most commonly used parameter of heart function is the ejection fraction, which expresses the proportion of chamber volume ejected with each heart beat, and by reconstructing the surface of the heart, this parameter can more readily be determined.

The reconstructed surface of the heart can also be used for the purpose of monitoring certain parameters indicative of the function of the left ventricle of the heart. These parameters may be used in evaluating a patient's condition during surgical procedures. Other important parameters include the range of motion of the left ventricular wall and the thickening of the ventricular wall, both of which are indicators of coronary heart disease, and of other disease entities. In addition, the shape of the ventricle provides information regarding its status, as the left ventricle becomes more spherical under certain loading conditions. These parameters also provide information that can be used to detect coronary heart disease and other medical problems of the heart. All of these parameters—volume, shape, ejection fraction, wall motion, and wall thickening, rely on having an accurate representation of the ventricular surface.

The effects of coronary heart disease are regional, being limited to the portion of the heart muscle receiving blood supply from an affected artery. When the internal diameter of an artery is reduced by atherosclerotic plaque, blood flow to the specific region of the heart supplied by that artery is restricted. As a result, some degree of dysfunction occurs in the affected heart muscle. During a heart attack, the affected muscle dies and is replaced by scar tissue, which is non-contractile. Thus, the progress of coronary artery disease is revealed by its effect on regional left ventricular function, and the severity of a heart attack is measured by the size of the dysfunctional region and by the extent of the dysfunction. Similarly, any improvement of regional function in the affected portion of the left ventricle is an indication of the effectiveness of a prescribed treatment.

The appearance of dysfunction in a previously well-functioning ventricle is a serious warning that the blood supply is insufficient. Should a deterioration of function occur during surgery, it may be construed as an indication that the anesthesiologist should increase the fluid volume and/or engage in other corrective measures. The detection of regional dysfunction has also been used during stress studies, wherein a patient's heart is imaged using ultrasound while at rest and after exercise, to determine whether the patient's arteries, which may have been open sufficiently while at rest, provide inadequate blood flow during exercise. The degree of dysfunction after a heart attack has occurred may also be determined to develop a prognosis. For example, patients with serious residual dysfunction after a heart attack are at a higher risk of dying in the first year, and more aggressive treatment may be indicated.

The mitral valve controls the flow of blood entering the left ventricle. Under certain disease processes, the leaflets of the mitral valve may become distorted in size, becoming larger and more redundant. The shape of the leaflets may also vary, particularly when the leaflet size is increased, or when the structures that help to tether the leaflets in their proper position become misaligned, ruptured, or stretched. Variations in leaflet size or shape may affect the ability of the valve to open or close properly.

Previous techniques for evaluating the valves and ventricles have typically relied upon two-dimensional imaging. However, it may be difficult to envision a complex cardiac structure even from multiple two-dimensional images. For example, the approach typically used for imaging the left ventricular wall can introduce significant error due to the failure of the technique to compensate for the angle of the beam relative to the cardiac wall. Furthermore, some modalities of two-dimensional imaging, such as x-ray angiography, provide only one or two projection views of the heart. Even imaging modalities that provide multiple views, i.e., ultrasound, magnetic resonance, and computed tomography, are limited in their ability to clearly localize regional dysfunction of the left ventricle, whose anatomy is difficult to grasp from two-dimensional images without extensive training and experience. Multi-planar two-dimensional imaging also has failed to properly visualize the mitral valve annulus, whose saddle shape was not appreciated until three-dimensional imaging was performed in live patients.

Therefore, it would be useful to have the ability to model the heart in three dimensions. This ability would provide an overall view of an affected region that allows a physician to immediately interpret the extent and degree of dysfunction. Accordingly, several methods have been developed that utilize multiple two-dimensional view data to model the heart in three dimensions. These methods generally utilize a geometric reference figure to which the organ is compared, and are based on a spherical or helical coordinate system. Such coordinate system based methods may be unsuitable in patients whose hearts are distorted by disease, and may be applicable only to the left ventricle, which tends to be more regular and consistent in size and shape than the right ventricle in different patients. Furthermore, these methods are not designed to reconstruct planar structures such as the mitral valve leaflets. Another limitation of currently available reconstruction methods is the inability to referentially model specific portions of the heart for comparison to the corresponding portion of normal, undiseased hearts. Yet the quantitative analysis of regional ventricular function, either by measuring wall motion or wall thickening, requires some means for comparing the results obtained within a given region of a patient's heart with the range observed for the same region in a population of patients having normal hearts.

Regardless of the object of interest, a method that references specific regions of the surface reconstruction to the corresponding input point data so as to provide a specific identification of those regions, and which is generally independent of the size and shape of the object, should improve the applicability of the reconstruction for various applications. In imaging the heart, the ability to identify certain anatomic features on the reconstruction of its surface is useful in analyzing parameters of cardiac function such as wall motion and wall thickening in the region that may be abnormal due to a disease process. Furthermore, a method that references specific regions of the heart to a standard or average cardiac template so as to identify an affected region of a patient's heart (even if abnormal due to disease) should aid in better assessing problems that are diagnosed.

Although much of the preceding discussion has dealt with the medical uses of a reconstructed surface for an organ such as the heart or the left ventricle of the heart, it should be noted that the techniques to achieve a reconstructed surface of an organ have much broader application. It should readily be apparent that a technique enabling limited input data derived from imaging virtually any type of object to be applied in reconstructing the surface of the object, relative to selected features of the object, can be used for numerous other purposes that are completely unrelated to medicine.

SUMMARY OF THE INVENTION

In accordance with the present invention, a method is defined for generating a surface reconstruction of an object. A specific application of this method is to reconstruct the surface of the heart. The method includes the step of first imaging the heart to produce imaging data. Using the imaging data, the contours of the left ventricle or of some other structure of interest, and of related anatomic landmarks or features, are delineated and recorded in the form of x, y, and z coordinates. The coordinates for each landmark and for the left ventricle constitute an input point data set for that structure. An abstract control mesh is generated, which is designed to fit the left ventricle for any of a variety or wide range of normal and diseased hearts. The abstract control mesh contains a plurality of abstract features, each consisting of a set of vertices, edges, and/or faces corresponding to an anatomic landmark on the object. For example, anatomic landmarks for the left ventricle might include the mitral annulus, which is defined as a set of edges, the apex, which is defined as a point, and the septum, which is defined as a set of contiguous faces. The abstract vertices, edges, and faces are labeled according to their location relative to various abstract features, providing means for identifying locations on the object, e.g., on the left ventricle. When the abstract control mesh is fit to the input point data sets of an object such as the left ventricle, and to associated features such as the anatomic landmarks obtained from imaging the patient's heart, an embedded control mesh is produced by assigning three-dimensional locations to each vertex of the abstract control mesh, and an embedded subdivided mesh is produced by recursive subdivision of the embedded control mesh.

During the fitting step of the method, the vertices on the abstract control mesh are initially manually assigned x, y, and z coordinates that yield an embedded subdivided mesh with a generally ventricular shape, for example, by using a computer assisted drawing (CAD) program, producing a shaped model. Next, the shaped model is rigidly aligned to the input point data sets, yielding an aligned embedded mesh.

The method further comprises the step of iteratively adjusting the location of the embedded control mesh vertices to improve the fit of the faces of the subdivided mesh to the input point data sets. The adjustment continues until the change in the value of the loss function and the changes in the locations of the vertices of the embedded control mesh satisfy a standard convergence test. For practical purposes, an upper bound is placed on the number of iterations. The loss function includes a residual energy, which is a measure of both the distance from points in the input data set to the nearest faces in the corresponding abstract feature, and a smoothness penalty. In the preferred embodiment, a parameter called "tension" controls a relative weight of the smoothness penalty versus the residual energy terms of the loss function.

Another aspect of the present invention is directed to a method for reconstructing anatomical features of the heart, such as the endocardial surface of the right ventricle, the epicardial surface of either ventricle, any of the leaflets of the mitral valve, or any surface of the heart, or any other object. This method includes steps that are generally consistent with the steps of the method described above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Overview of the Method for Reconstructing a Surface

It must be emphasized that the present invention can readily be applied to reconstructing the surface of any three-dimensional object, has application in many different areas of technology, and thus is not limited only to medical applications. For example, to more accurately size clothing, the bodies of a population of different individuals can be scanned to produce three-dimensional image data, and the present method can be applied to reconstruct the surfaces of the bodies. The reconstructed body surfaces can be used to more accurately determine a range of dimensions such as collar size and sleeve length. However, since the present invention was developed to reconstruct a surface of an object using image data that are relatively sparse and noisy, such as the data produced by imaging an organ, it is helpful to illustrate the present invention by applying it to reconstruct the surface of a left ventricle in a patient's heart.

Figure 1:
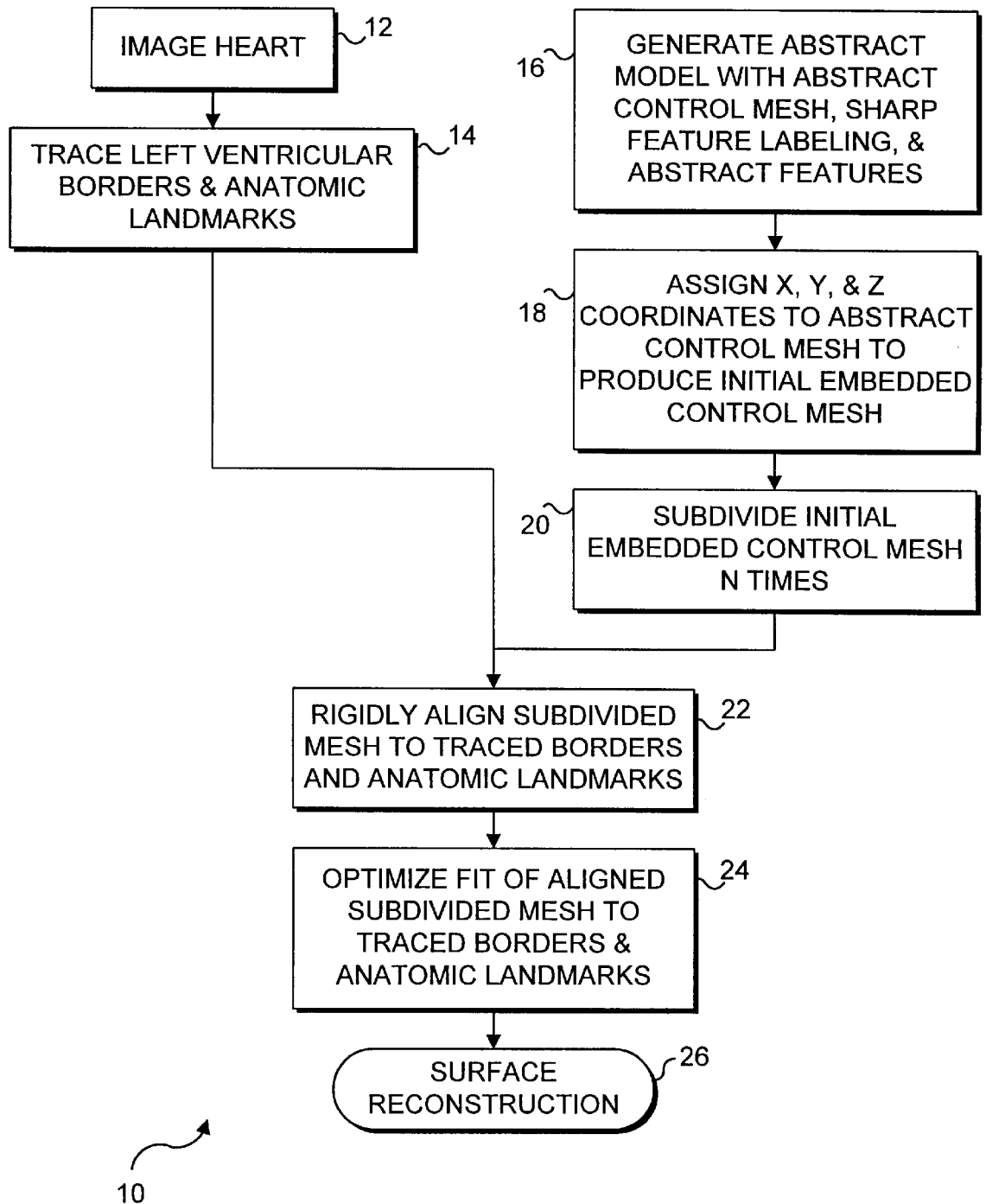
FIG. 1 is a top level or overview flow chart that generally defines the steps of the method for reconstructing the left ventricular surface using data from randomly oriented image planes and anatomic landmarks.

FIG. 1 includes a top level or overview flow chart 10 that generally defines the steps of the method used in the present invention for reconstructing the left ventricular surface. For this application, the method employs data derived from randomly oriented image planes and anatomic landmarks. In general, in a block 12 of FIG. 1, the data for a heart are acquired by imaging the heart in multiple planes whose location and orientation in three-dimensional space are known. The borders of the left ventricle and other anatomic structures, features, or landmarks (these three terms being generally synonymous as used in this disclosure) are traced at end diastole and end systole in a block 14, producing an input data set that includes points representing the locations of the anatomic landmarks.

Based on a knowledge of cardiac structure, and on the requirements for analyzing parameters of cardiac status and function, an abstract model is generated in a block 16. The abstract model includes abstract faces, edges, and/or vertices labeled according to their location relative to the anatomic landmarks. X, y, and z coordinates are manually assigned to the vertices of the abstract model in a block 18, to produce an initial embedded control mesh. In the preferred embodiment, the data for a plurality of hearts are averaged to produce the x, y, and z coordinates for the vertices of the abstract model. The initial embedded control mesh is subdivided N times in a block 20. In the preferred embodiment, the value of N is equal to 2. This step produces an embedded subdivided mesh, which is then applied to the data for an individual's heart.

In a block 22, the embedded subdivided mesh is rigidly aligned to the input data set defining the traced borders and location of the anatomic landmarks, which was produced in block 14. The vertices of the embedded subdivided mesh are then adjusted to optimize the fit of the aligned subdivided control mesh to the input data in a block 24. This last step yields the reconstructed surface, as indicated in a block 26

Description of a Cardiac Imaging and Model Processing System

Figure 2:
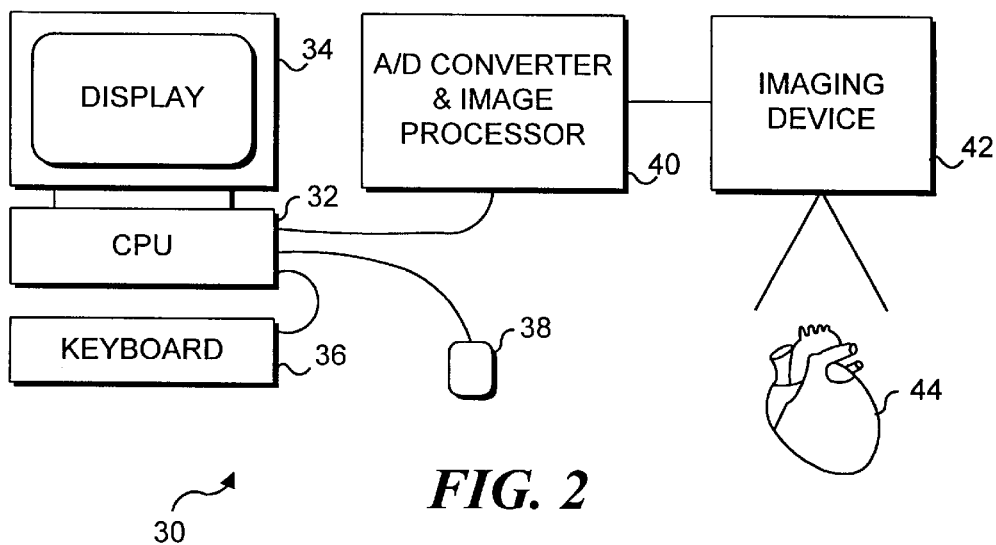
FIG. 2 is a schematic block diagram of a system in accordance with the present invention that is used for imaging the heart of a patient, and analyzing the images to determine cardiac parameters.

A cardiac imaging and model processing system 30 that is used to produce the images that are traced to define the left ventricle and anatomic landmarks (in block 14 of FIG. 1) is disclosed in FIG. 2. This system includes a central processing unit (CPU) 32 that is typically part of a personal computer or graphic workstation terminal, and which is coupled to a graphics display 34 and to a keyboard 36 for input of data or instructions controlling the image processing and modeling procedures used to reconstruct a surface of a patient's heart in accordance with the present invention. In addition, a mouse 38 (or other pointing device) is coupled to CPU 32 for use in graphically controlling software running on CPU 32, for example, by selection of menu items, or for manually tracing images produced on graphics display 34, as explained below.

CPU 32 is coupled through an appropriate input card or port (neither shown) to an analog-to-digital converter (ADC) and image processor 40. ADC and image processor 40 receives an analog signal produced by an imaging device 42, converts the analog signal to a digital signal, and processes the digital signal to a form appropriate for input to CPU 32 and display on graphics display 34. In addition, ADC and image processor 40 controls the imaging device as it scans a heart 44 beating inside a patient (not shown). Details of the processing are not included, since they depend on the type of imaging device used and are well known in the art. For example, it is contemplated that imaging device 42 may comprise an ultrasound probe, a magnetic resonance imaging system, or a cine CT imaging system, all of which are well known to those of ordinary skill in this art. Although each of these types of imaging devices could provide the analog signal used to create an image of heart 44 on graphics display 34, the current preferred form of cardiac imaging and model processing system 30 uses ultrasound for imaging heart 44.

Figure 3A:
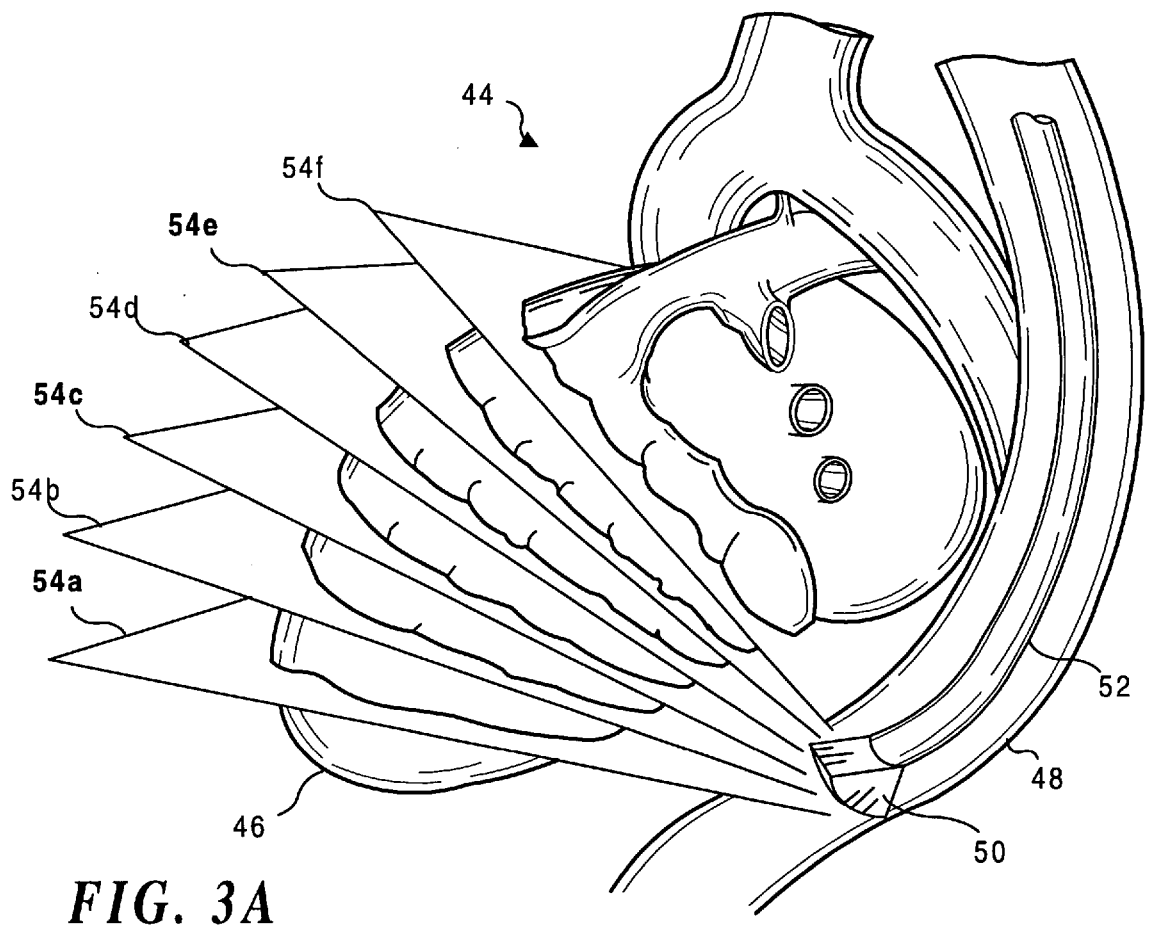
FIG. 3A is a schematic view of a heart and a portion of an esophagus, illustrating how a transesophageal ultrasonic probe is used to image the heart.

Specifically, as shown in FIG. 3A, a transesophageal ultrasonic probe 50 is the preferred form of imaging device 42. This probe is schematically illustrated in a position adjacent heart 44, where it has been inserted through a patient's esophagus 48. The transesophageal ultrasonic probe is coupled to ADC and image processor 40 (shown in FIG. 2) through a cable 52, which extends upwardly through the esophagus and out of the patient's mouth (not shown). Since esophagus 48 extends downwardly toward the stomach (not shown) at the back side of the heart, the transesophageal ultrasonic probe can readily be located within the esophagus or stomach in an ideal position to ultrasonically scan at least a selected portion of heart 44. In the illustrated example, transesophageal ultrasonic probe 50 is positioned to scan a left ventricle 46 of the heart.

Imaging Data

At this point, it should be emphasized that although the preferred embodiment of the present invention is disclosed by way of example, in connection with reconstructing the surface of left ventricle 46, it is equally applicable and useful in reconstructing the surfaces of other portions of the heart so that parameters indicative of the condition of the patient's heart can be evaluated, as discussed above. In particular, because of a referential mapping scheme employed by the present invention in reconstructing the surface, the determination of cardiac parameters in relation to the anatomical landmarks of the heart is applicable to portions of the heart that vary significantly from patient to patient, both in size and shape. It should also be noted that a design for transesophageal ultrasonic probe 50 has been developed that is particularly useful for scanning the heart to produce imaging data used in the present invention; however, details of the design of this probe are not disclosed herein, since they do not directly relate to the present invention. A more conventional ultrasonic probe can also be used for this purpose, including one operated transcutaneously, as long as the location and orientation of the probe can be recorded for each imaging plane. A number of techniques have been developed for measuring and recording the position and orientation of a transcutaneous ultrasonic probe, but details concerning these probe tracking techniques are also not disclosed, because they do not directly relate to the present invention.

Figure 3B:
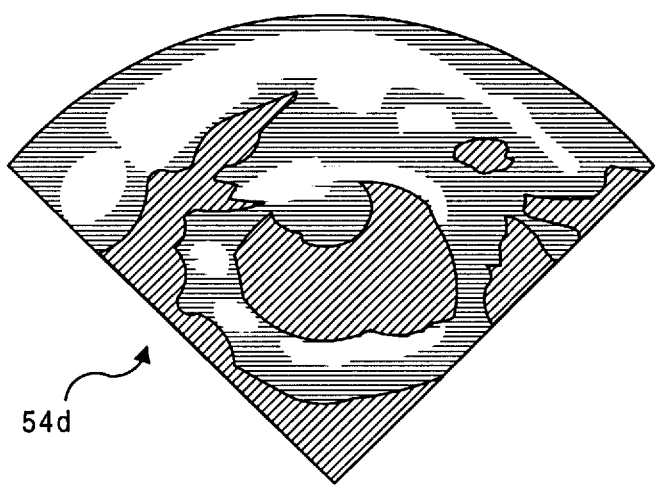
FIG. 3B is a graphic representation of one of the image planes produced by the transesophageal ultrasonic probe.

In the position shown in FIG. 3A, transesophageal ultrasonic probe 50 produces a plurality of images along planes 54a through 54f. An exemplary image along plane 54d is illustrated in FIG. 3B generally as it would appear on graphics display 34 (shown in FIG. 2), although substantially sharper in detail than a true ultrasonic image would appear. In effect, each image plane represents a cross-sectional scan of left ventricle 46, showing the various anatomical landmarks of the heart and both the inner and outer surfaces of the left ventricle in the particular plane of the scan. Ideally, ultrasonic scans should be made of heart 44 from a plurality of different positions.

Figure 4:
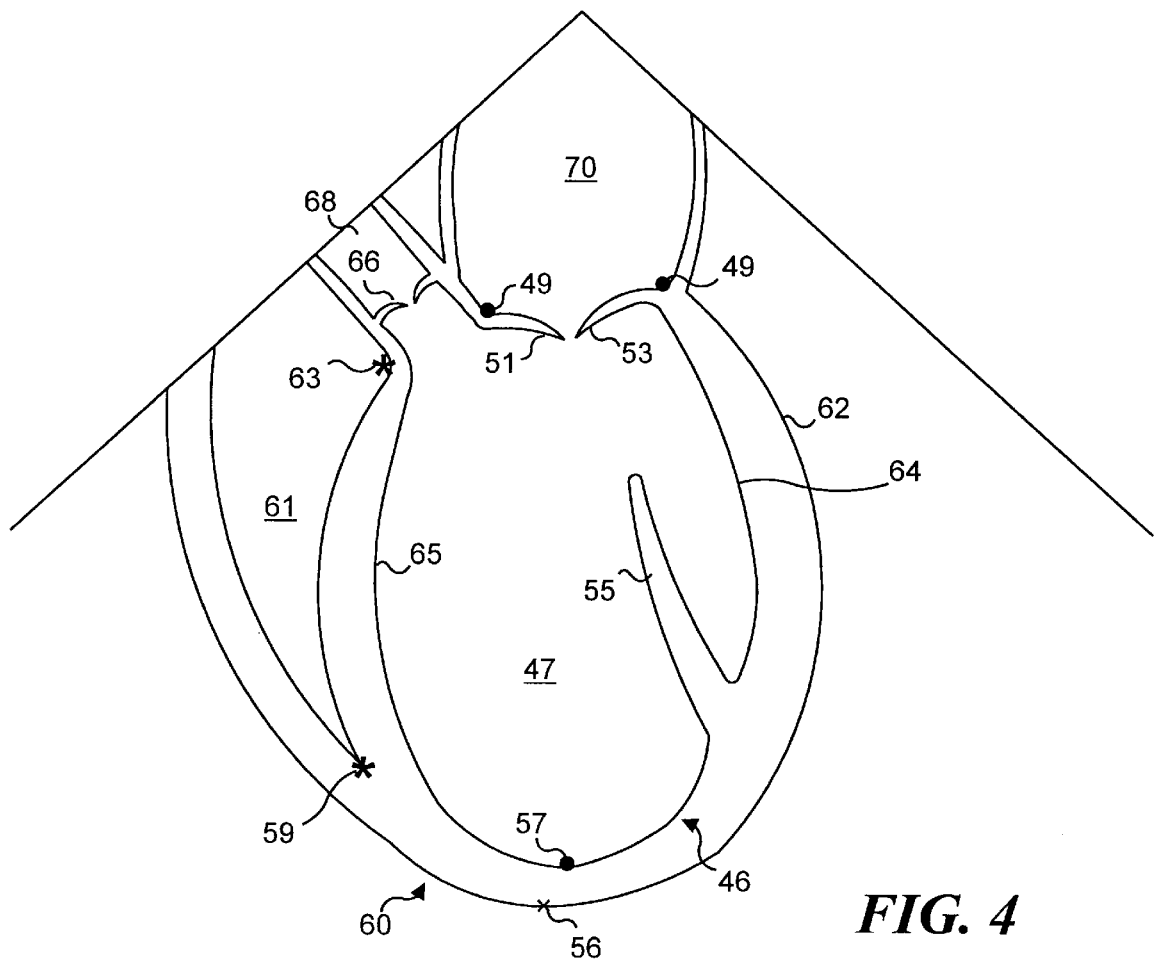
FIG. 4 illustrates a schematic cross-sectional view of a portion of the heart imaged along its longitudinal axis, through the left ventricle, and indicating the anatomic landmarks associated with the left ventricle.

FIG. 4 shows a schematic representation 60 of an ultrasonic imaging system scan made along the longitudinal axis of heart 44, principally focusing on left ventricle 46 with its enclosed chamber 47. An outer surface 62 (medically referred to as the epicardium) is clearly visible, as is an inner surface 64 (medically referred to as the endocardium). Also indicated in the longitudinal axis view of FIG. 4 is an aortic valve 66 at the mouth of an aorta 68. A portion of a left atrium 70 is visible in the upper portion of the ultrasonic scan image. Additional anatomic landmarks are mitral valve annulus points 49, anterior and posterior mitral valve leaflets (51 and 53, respectively), a right ventricle 61, an anterior papillary muscle 55, apices on the endocardium and epicardium (57 and 56, respectively), and an interventricular septum 65. Septal epicardial base and apex points (63 and 59, respectively) are used to identify the basal and apical bounds of the septum.

Figure 5:
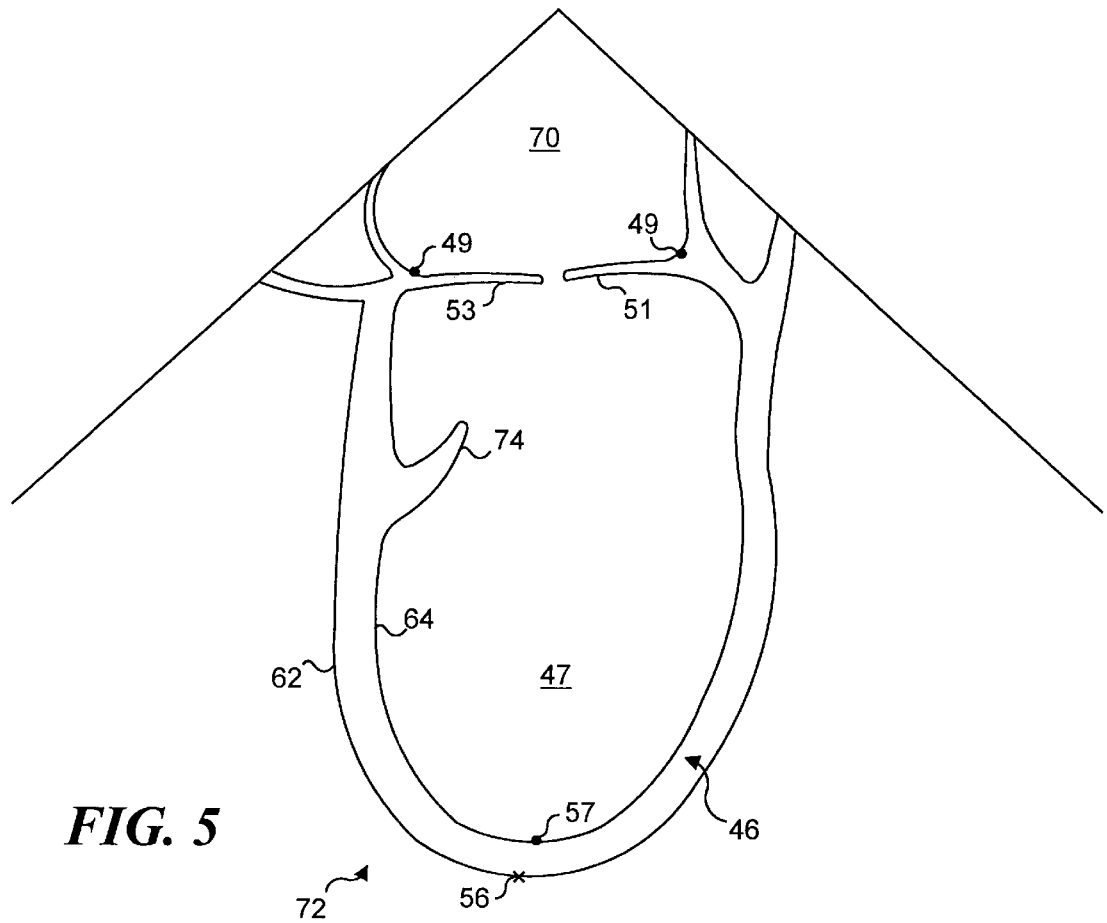
FIG. 5 is a schematic cross-sectional view of the heart imaged along its longitudinal axis, in a different plane from FIG. 3, indicating additional anatomic landmarks.

By moving the transesophageal ultrasonic probe to a different position, a chamber image view 72 as schematically illustrated in FIG. 5 is produced. In this view, a posterior papillary muscle 74 is visible, in addition to the other anatomic landmarks already noted above in FIG. 4.

Figure 6:
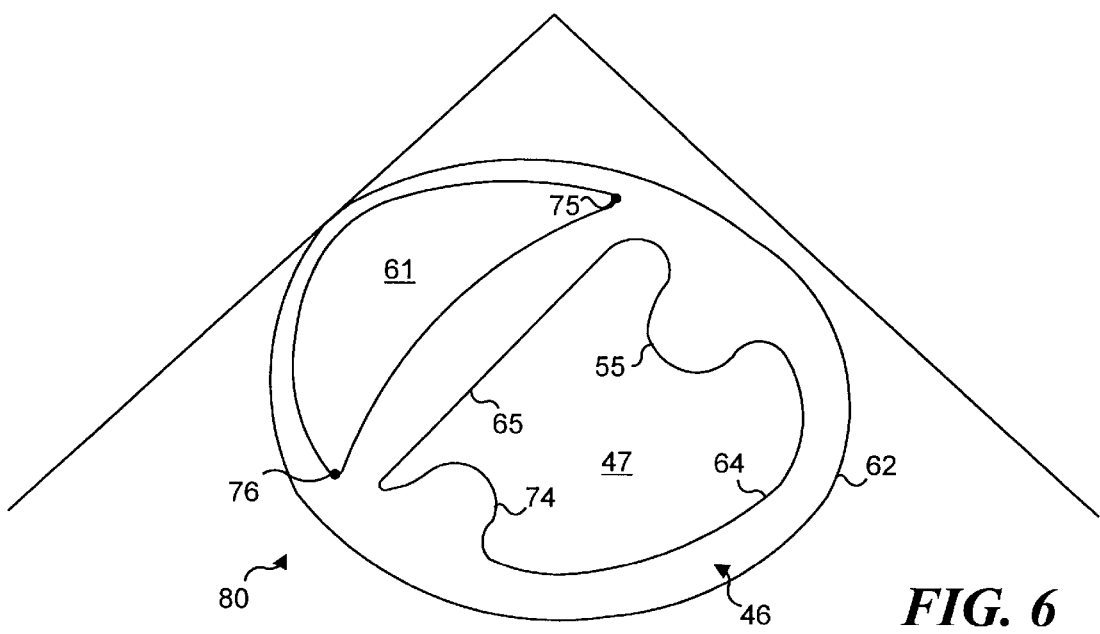
FIG. 6 is a schematic cross-sectional view of the left ventricle, imaged along a transverse axis, with associated anatomic landmarks.

Finally, a transverse or short axis view depicted in an image 80 of left ventricle 46 is shown in FIG. 6. In this Figure, the intrusion of the anterior and posterior papillary muscles 55 and 74 into the chamber of left ventricle 46 is more clearly evident. Also, anterior and posterior septal points 75 and 76, respectively, are used to identify the lateral bounds of the septum.

The images produced by imaging device 42 can be stored for later processing by CPU 32 on any appropriate nonvolatile storage device, such as an analog disk, or analog magnetic tape (e.g., video tape). Alternatively, the digital data provided by ADC and image processor 40 can be conveyed over a local or wide area network to CPU 32 for display on graphics display 34, or can be stored on a hard drive or on digital magnetic tape associated with the CPU, for subsequent processing.

Figure 7A:
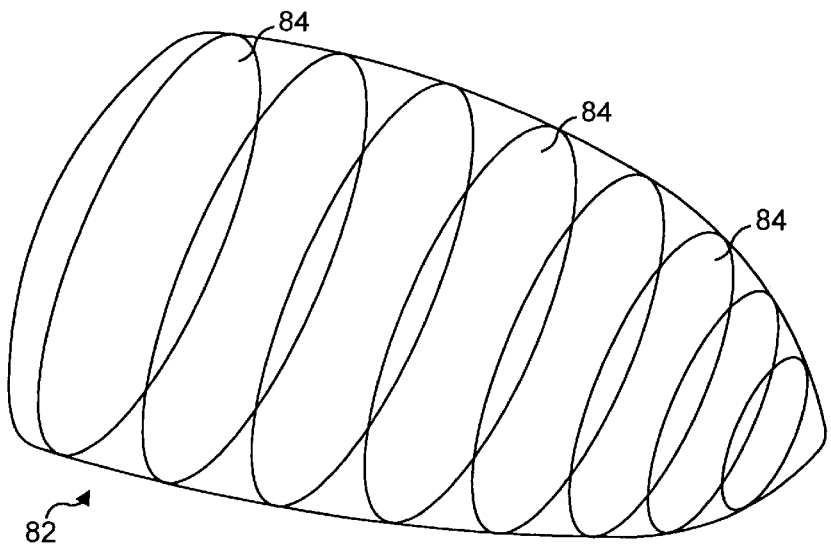
FIGS. 7A and 7B schematically illustrate the cross-sectional image planes that are in parallel with the transverse axis of the heart and those that are orthogonal thereto, in parallel with the longitudinal axis, as produced by a magnetic resonance imaging system.
Figure 7B:
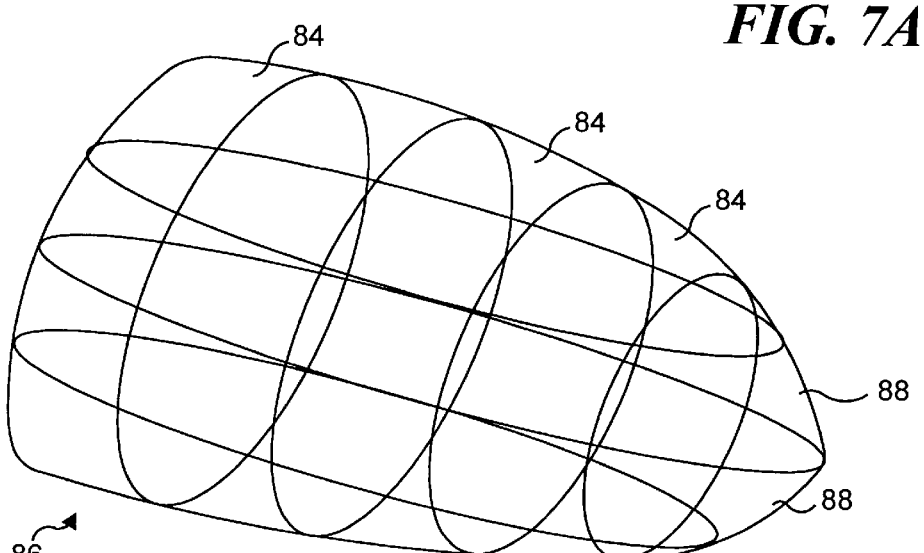

FIGS. 7A and 7B disclose the image planes of the left ventricle used to produce the imaging data with a magnetic resonance imaging system. A magnetic resonance system provides image data 82 for a plurality of planes 84 that are either transverse to a longitudinal axis, i.e., parallel to the transverse axis of the left ventricle (neither axis shown), or transverse to the long axis of the patient's body (also not shown). In addition, imaging is also carried out in an orthogonal direction to produce imaging data 86, along a plurality of planes 88.

It should be noted that imaging data of the heart from a magnetic resonance system is generally obtained frequently enough during the cardiac cycle so that each of the transverse and longitudinal image planes is secured at intervals separated in time by about 33 milliseconds. The peak of the R-wave on an electrocardiogram (ECG) (not shown) is used to trigger the imaging system for each cardiac cycle. Alternatively, in some ultrasound systems, the imaging data are acquired at a fixed interval of 33 milliseconds without regard to the patient's heart rate or ECG.

Figure 8A:
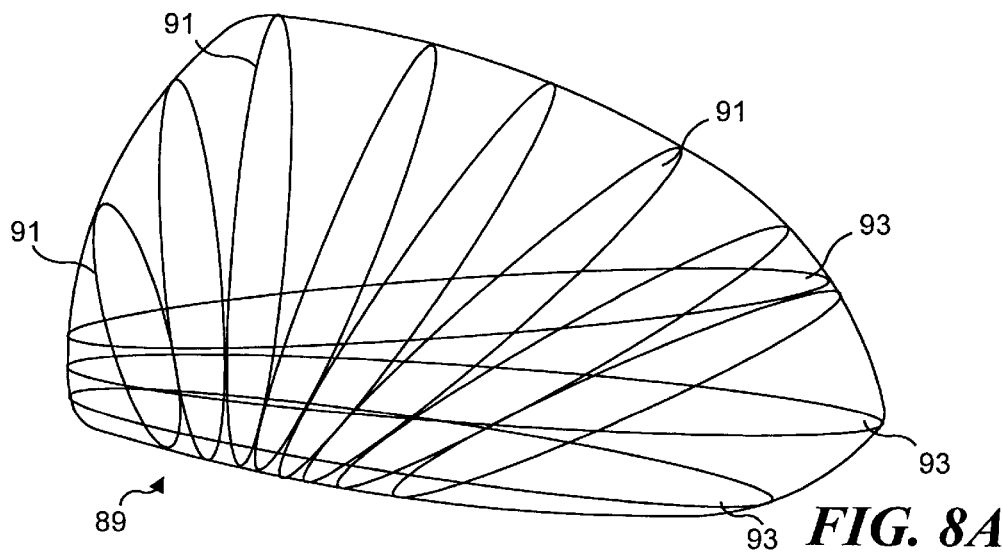
FIGS. 8A and 8B respectively illustrate angled cross-sectional image planes obtained with an ultrasonic probe from two different imaging positions, and the rotational cross-sectional image planes obtained with an ultrasonic probe manipulated in a fixed position.
Figure 8B:
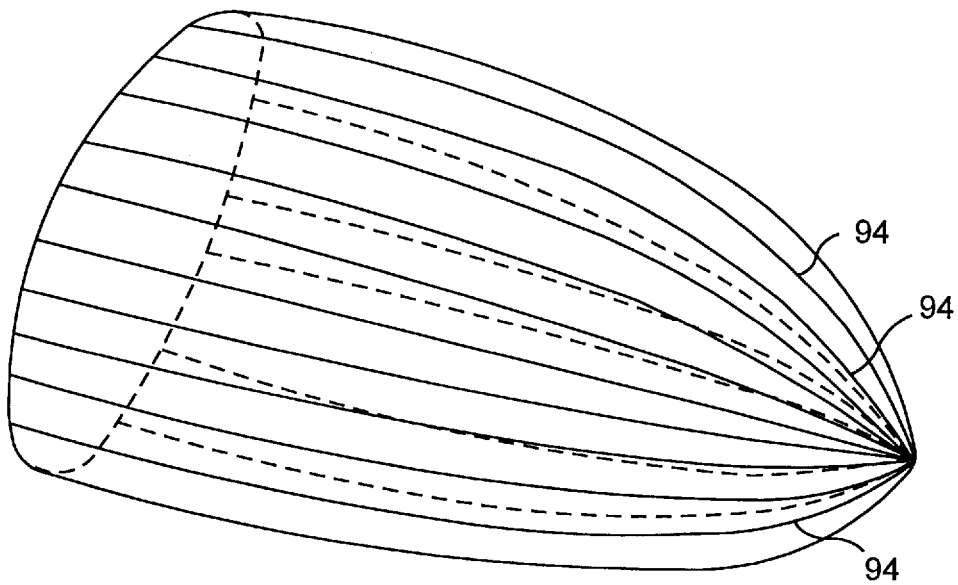

As shown in FIG. 8A, the imaging planes developed by using transesophageal probe 50 include a plurality of angled planes 91 that are scanned when the esophageal probe is disposed in one position, and a plurality of angled planes 93 that are scanned when the esophageal probe is in a different position. The transesophageal echo probe 50 may also be rotated from a single fixed position to obtain a plurality of rotated planes 94 as illustrated in FIG. 8B.

Figure 9:
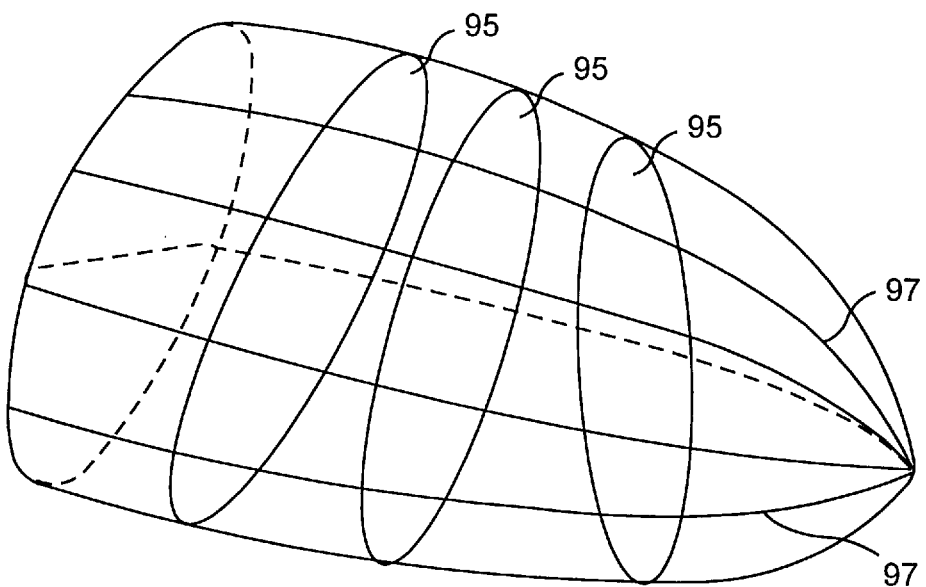
FIG. 9 illustrates the angled and rotational cross-sectional image planes obtained with a transcutaneous ultrasonic probe positioned in the parasternal and apical acoustic windows.

FIG. 9 illustrates the imaging planes typically obtained using a transcutaneous ultrasonic probe. As was true for the transesophageal echo probe, the images produced using a transcutaneous ultrasonic probe may include a plurality of angled planes 95 obtained from one or more probe positions and/or and orientations, as well as rotated planes 97 that are obtained from a different probe position and orientation.

Processing the Images to Obtain Input Data Sets

Referring back to FIG. 2, once an image along one of the planes scanned by imaging device 42 is visually represented on graphics display 34, an operator can manually outline or trace the borders of the left ventricle endocardium and epicardium using mouse 38. When manually outlining these surfaces on a given image plane, borders corresponding to specific anatomic structures within heart 44 are input by tracing these structures to define landmarks or reference points. These anatomic structures include papillary muscles 55 and 74, the interventricular septum 65, and various valves, such as aortic valve 66. For tracing of the left ventricle, the mitral annulus 49 is preferably included in detail, as an additional reference landmark. It is not intended that the selected anatomic features of the preferred embodiment in any way limit the scope of this invention. Clearly, other anatomic landmarks could be selected in addition or as alternatives to those noted above.

The image planes developed by imaging device 42 will typically be scanned over several cardiac cycles. During at least one cardiac cycle, an end diastole and an end systole will be selected for each of the image planes. The end diastole frames represent the left ventricle at the time of the greatest chamber area, and similarly, the image planes at end systole will be selected to represent the left ventricle when it has the smallest chamber area. To determine which image planes were scanned at a particular time during the cardiac cycle, an ECG and/or a phonocardiogram will be recorded during the imaging process, providing cardiac cycle data corresponding to each of the image planes scanned that identify the particular time in the cardiac cycle in which the image plane was produced. The endocardial and epicardial borders that are manually traced are stored as x-y coordinates, representing a series of points defining the inner and outer surface of the heart and the referential anatomic landmarks during each image plane visualization. Since the left ventricular contours on angiograms are traced at the outer limits of the intertrabecular crevices, visualized as wispy streaks of contrast, the endocardial border in ultrasound-produced images will be traced at the outermost edge of the blood-myocardium interface.

It is also contemplated that the tracing of these image plane visualizations can alternatively be accomplished by software running on CPU 32 without human intervention. In other words, the current manual tracing step will be replaced by a computer automated procedure to obtain equivalent border-traced data points using software that responds to differences in contrast and shading in the graphics image to recognize borders of the endocardial and epicardial surfaces and anatomical structures that should be included in the traced data. The automated tracing of the image plane visualization will be required to accomplish determination of cardiac parameters based on a reconstructed surface of the heart (or left ventricle) in real time.

The traced borders and referenced cardiac structure anatomic landmarks in the heart represent data that are stored in a database, together with header information identifying the patient and the location and orientation of the imaging plane for which the data were developed. Once all of the images developed by scanning the heart of the patient have been traced, the borders developed by the manual (or automated) tracing procedure are output from the database as x, y, and z coordinates, the z coordinate depending upon the spatial position of the particular image plane that was traced to produce the series of data points defining the borders of the surfaces of the heart and its anatomical landmark structures. These points comprise an input data set for the patient.

The data developed by tracing the surfaces of the heart represented by the image planes are then assembled and used to prepare a three-dimensional reconstruction of the left ventricular endocardium and epicardium, i.e., the inner and outer surfaces of the heart, by the method described below. In addition, a model of the endocardial surface at both end diastole and end systole, representing the location of the endocardial surface at the two extreme chamber volume conditions during a cardiac cycle, is created using the data developed for each image plane at the end diastole and end systole times during the cardiac cycle. The second model is used in determining the range of motion for different portions of the left ventricle.

The reconstruction method fits piecewise smooth surfaces to an input data set of points. This method adapts a more general surface reconstruction method described by Hoppe et al. in the references mentioned above under the Background of the Invention, to meet two specific requirements. These requirements are (1) the ability to use sparse, noisy, unevenly distributed input data points; and, (2) the ability to associate the reconstruction of the surface with one or more features, which in regard to the heart are the anatomic landmarks identified above.

Details of the Process for Producing the Reconstructed Surface of the Left Ventricle It is useful to begin a disclosure of the details of the process used in the present invention by defining terms that represent concepts used in a preferred embodiment. One of the more difficult concepts to visualize in regard to this invention is the "abstract control mesh." The abstract control mesh is a two-dimensional simplical complex, a set of abstract vertices, abstract edges, and abstract faces. The abstract control mesh determines the topology of the surface that is fit to data from a left ventricle and to the associated anatomic features of the left ventricle. An "abstract vertex," otherwise known as a zero-simplex, is a unique identifier in the abstract control mesh. It is not a point in any geometrical three-dimensional space, because it lacks coordinates. An "abstract edge" or a one-simplex is a pair of abstract vertices in the abstract control mesh; it is not a line segment because it lacks coordinates in a three-dimensional space. An "abstract face" or two-simplex is a set of three abstract vertices and the three associated abstract edges in the abstract control mesh; but, it is not a triangle. The abstract control mesh only contains simplices with degree less than or equal to two.

The embedding of an abstract control mesh into three-dimensional space associates a three-dimensional point, i.e., the embedded vertex, with each abstract vertex. Thus, the abstract vertices act as placeholders for the coordinates that are assigned to them when the abstract control mesh is embedded into three-dimensional space. There is correspondingly a three-dimensional line segment, the embedded edge, which is associated with each abstract edge, and a three-dimensional triangle, the embedded face, which is associated with each abstract face. The collection of these triangles comprising the embedded faces forms a piecewise, linear, triangled surface in three-dimensional space, which is referred to as an "embedded control mesh." In block 18 of FIG. 1, an initial embedded control mesh is developed by assigning average or typical x, y, and z coordinates to the abstract control mesh. It is important to clearly distinguish between the abstract control mesh, which is manually designed to be suitable for application to a wide variety of hearts of varying size and shape, and the embedded control mesh, which is determined for an individual heart (i.e., the heart of the patient being evaluated) by the automatic fitting procedure described below.

With reference to block 20 of FIG. 1, a subdivision surface is produced by recursively subdividing a relatively simple embedded control mesh, i.e., one having relatively few triangles. Each subdivision step takes an input parent mesh and produces an output child mesh with four times as many faces and a corresponding increase in the number of vertices and edges. The subdivision step also determines the embedding of the child mesh from the embedding of the parent mesh. The location of each vertex in the child mesh is an affine combination of the locations of "nearby" vertices in the parent mesh. The theoretical subdivision surface is the limit of an infinite number of subdivision steps. In practice, the smooth theoretical limit surface is approximated by the piecewise linear surface resulting from a finite number of subdivision steps. For practical reasons such as achieving a reasonable speed and resolution, only two subdivisions are made of the initial embedded control mesh in the preferred embodiment.

It should be noted that the major difference of the subdivision scheme introduced by Hoppe et al. in their work published in 1994 over other prior art is that it allows the surface to have a variety of different kinds of sharp features (tangent plane discontinuities) at the embedded edges and vertices. A piecewise smooth subdivision embedded control mesh surface is specified by (1) an abstract control mesh, (2) an embedding of the abstract control mesh, determined by associating a three-dimensional point with each abstract vertex, and (3) a labeling of the edges and vertices with the type of sharp feature, if any, which determines the weights used in subdividing the embedded control mesh.

An abstract feature is a sub complex of the abstract control mesh, a set of abstract vertices, edges, and faces, which represent a particular anatomical feature such as the mitral annulus. The ability to define and manipulate abstract features is the mechanism by which specified points in the input data set of points can be made to correspond to specific regions of the reconstructed surface. This is one of the significant advantages of the present method for three-dimensional surface reconstruction. For example, the mitral annulus is a ring of six edges at the base of the left ventricle.

The corresponding subdivided abstract feature comprises the set of abstract vertices, edges, and faces that result from subdivision of the original abstract feature. Thus, the twice subdivided mitral annulus feature is a ring of 24 edges at the base of the left ventricle. The embedded subdivided feature is the corresponding subset of the embedded subdivision surface. Consequently, the mitral annulus feature is a set of 24 embedded edges at the base of the embedded, subdivided surface. Note that the subdivision embedding is determined by the complete abstract control mesh, not by the abstract feature alone.

As noted above, a significant feature of the present method for three-dimensional surface reconstruction is its ability to deal with sparse, noisy, unevenly distributed input point data. In contrast, in the prior art method described by Hoppe et al., the input data used in developing the reconstructed surface of an object are dense, evenly distributed, accurate data. In order to reconstruct a surface (e.g., of an organ) from relatively sparse input point data derived from medical imaging, it is necessary to predefine a model of the expected shape of the object. Creating such a model comprises: (1) defining an abstract control mesh; (2) labeling edges and indicating vertices with sharp features, and (3) identifying a set of feature sub complexes.

Figure 10:
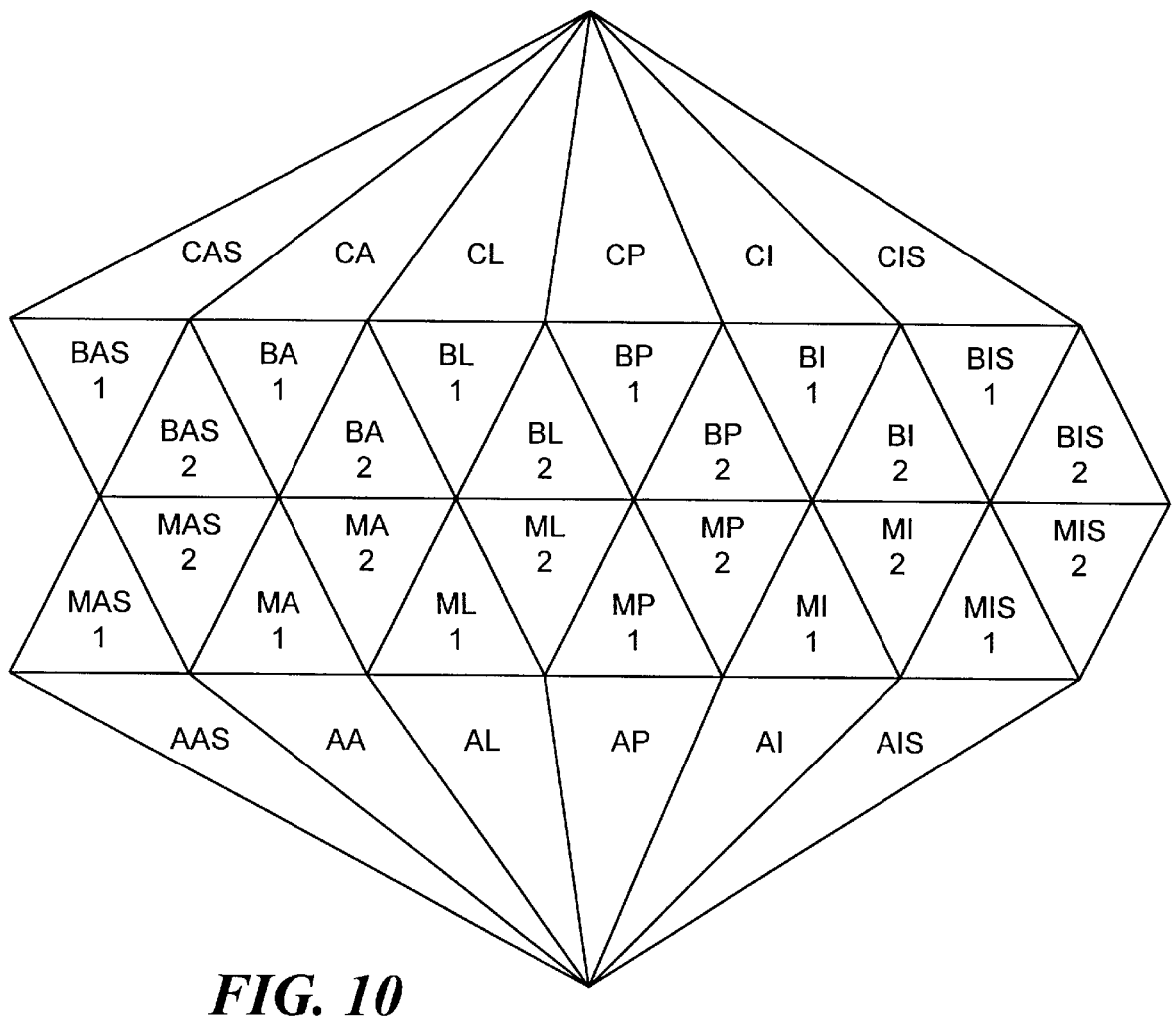
FIG. 10 illustrates one abstract control mesh for the left ventricle with labeled faces to indicate their association with anatomic landmarks.

FIG. 10 illustrates one abstract control mesh for the left ventricle. (This representation can be confusing, since the abstract control mesh really has no relevant shape until it is embedded as described above.) In this model, which represents a simplified heart, the base of the heart is limited to the mitral valve annulus, without separate outflow track. The faces have been labeled to indicate their association with anatomic landmarks. For example, the faces labeled "MA2" and "ML1" are associated with the anterior papillary muscle. Note that the faces "CAS", "BAS1", "MAS1", and "AAS" are contiguous or joined with faces "CIS", "BIS1", "MIS1", and "AIS", respectively, as the model is a continuous surface although illustrated here in an opened format. In this Figure, the following abbreviation convention is applied.

| ABBREVIATION | MEANING |
| --- | --- |
| C | Cap |
| A | Anterior |
| AS | Anter-Septal |
| L | Lateral |
| P | Posterior |
| I | Inferior |
| IS | Infer-Septal |
| B | Base |
| M | Middle |
| A | Apex |

Figure 11:
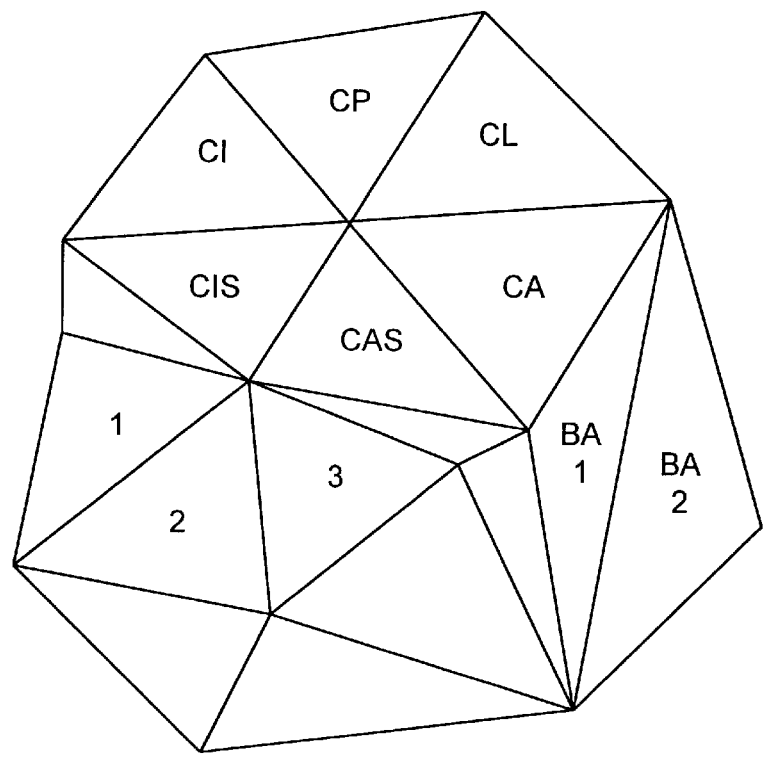
FIG. 11 illustrates part of an abstract control mesh for the left ventricle in which the outflow track is assigned additional triangles.

FIG. 11 illustrates a part of an abstract control mesh for the left ventricle in which additional faces (triangles) are assigned about the aortic outflow of the heart. The view is of the base of the heart, and the new triangles labeled "1", "2", and "3" represent the aortic valve.

Figure 12:
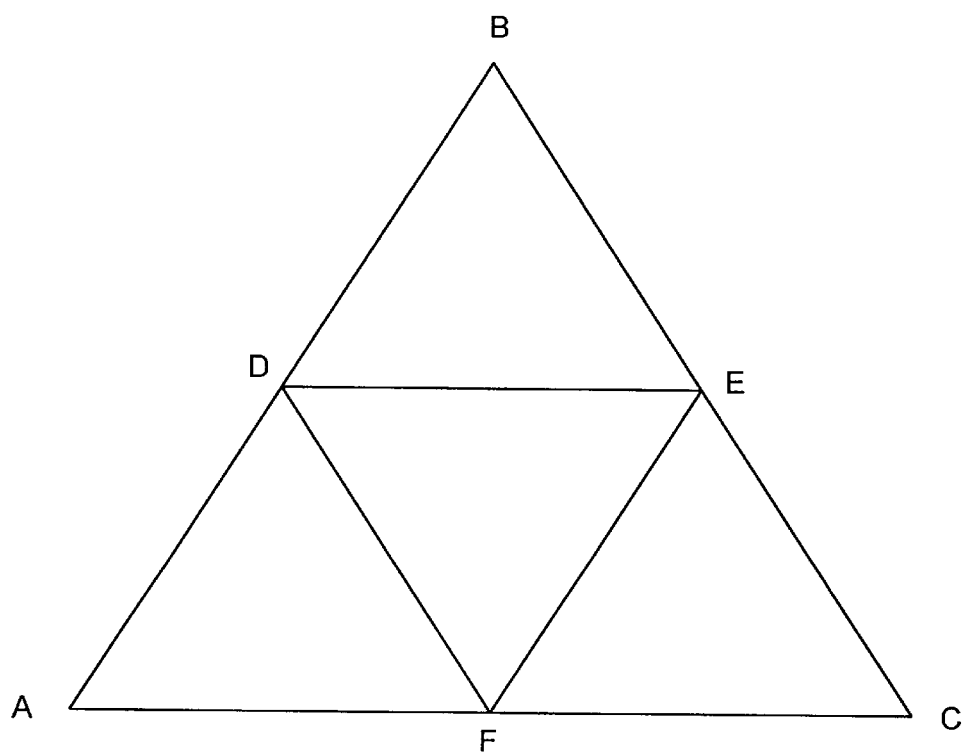
FIG. 12 illustrates the subdivision of triangles comprising the abstract control mesh into smaller triangles.

FIG. 12 illustrates how a face or triangle of the abstract control mesh is subdivided. In this simplistic example, a triangular face ABC in a parent embedded control mesh, e.g., the initial embedded control mesh, is subdivided into four smaller triangles: AFD, BDE, DEF, and CEF.

Figure 13A:
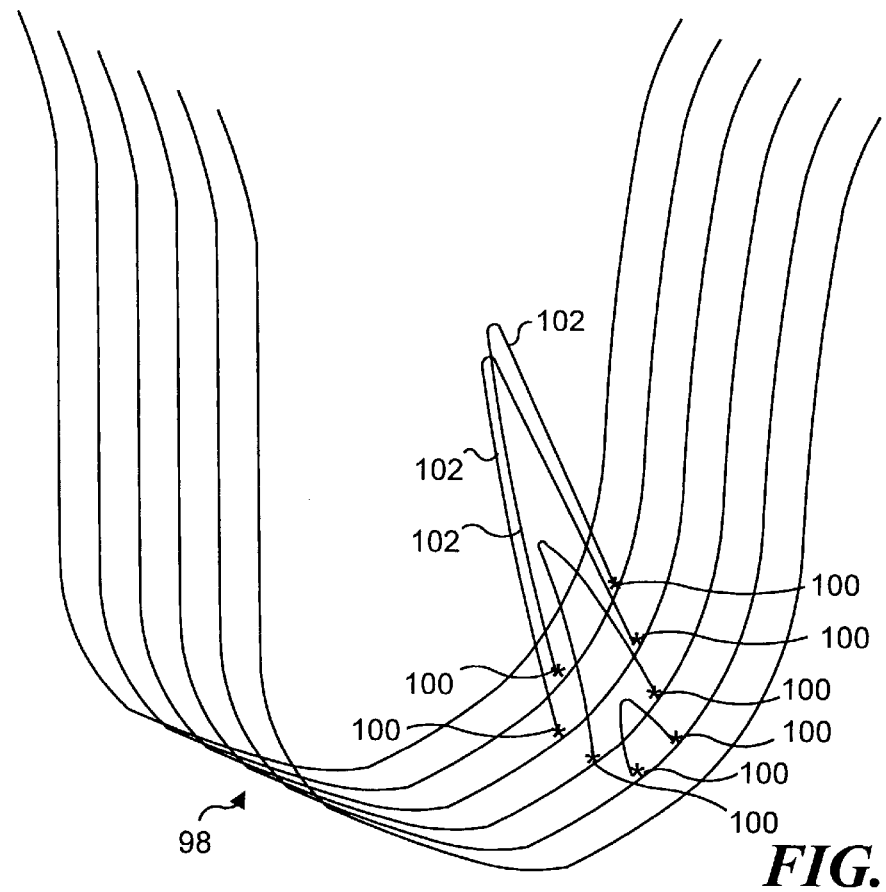
FIG. 13A and 13B schematically illustrate how triangles corresponding to a feature are fitted to the x, y, and z coordinates of the traced borders for the corresponding anatomic landmark.
Figure 13B:
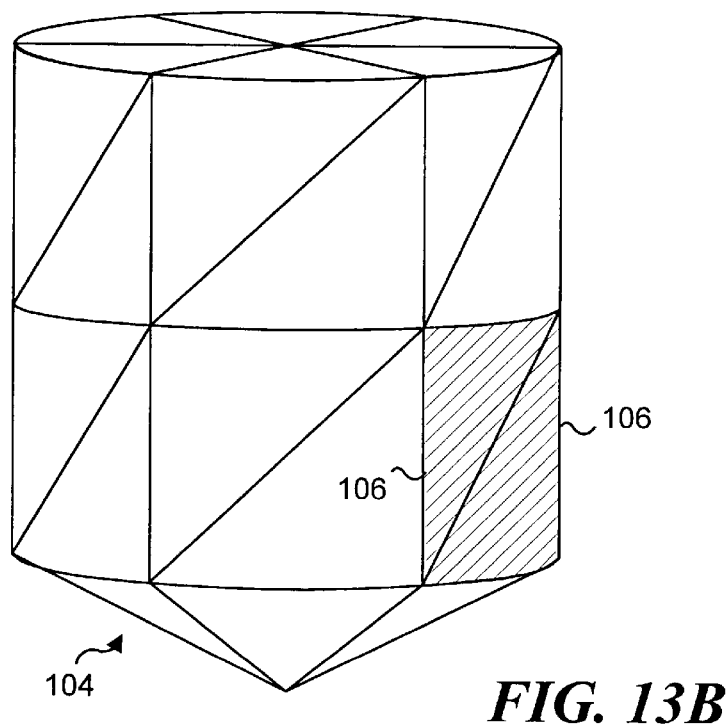

FIGS. 13A and 13B illustrate the concept of fitting triangular faces corresponding to an anatomic feature to the x, y, and z coordinates of the traced borders for the corresponding anatomic landmark applied to tracings 98 of the left ventricle. FIG. 13A schematically illustrates the tracings 102 of the anterior papillary muscle. Points 100 where the papillary muscle is inserted into the left ventricular endocardium are indicated by asterisks in this Figure, define the location of this anatomic landmark. Triangles 106 corresponding to the papillary muscle insertion are indicated on diagrammed abstract control mesh 104 of the left ventricle in FIG. 13B using shading.

Figure 14A:
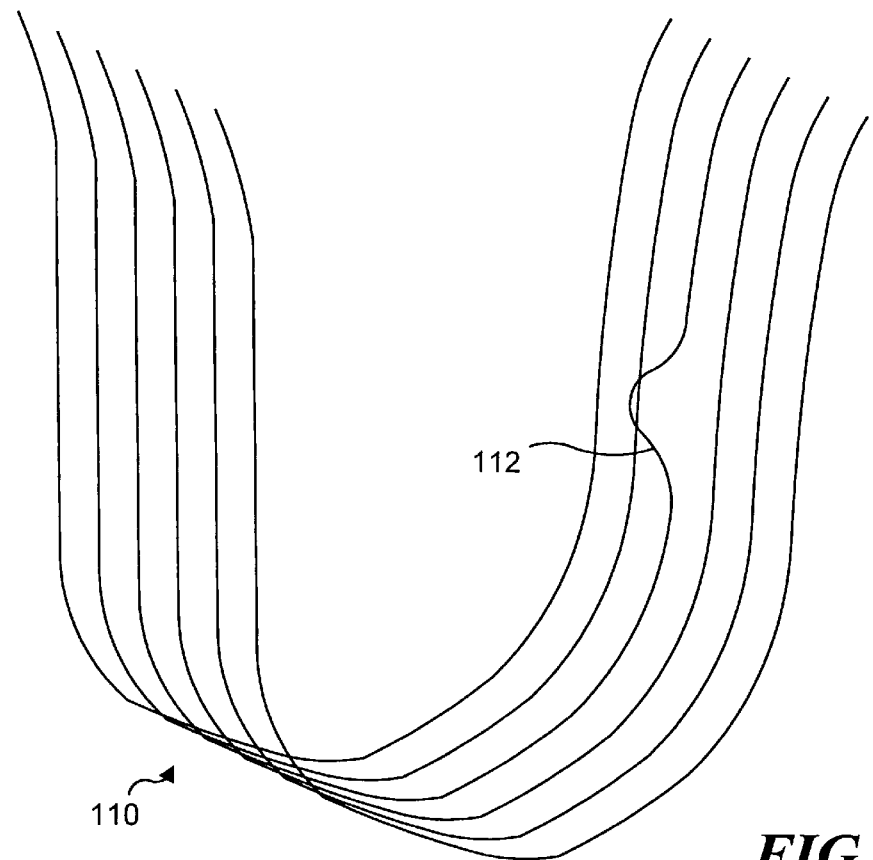
FIGS. 14A and 14B schematically illustrate how the surface would be unduly influenced by small perturbations in the input data points if there were no smoothness penalty term in the loss function.
Figure 14B:
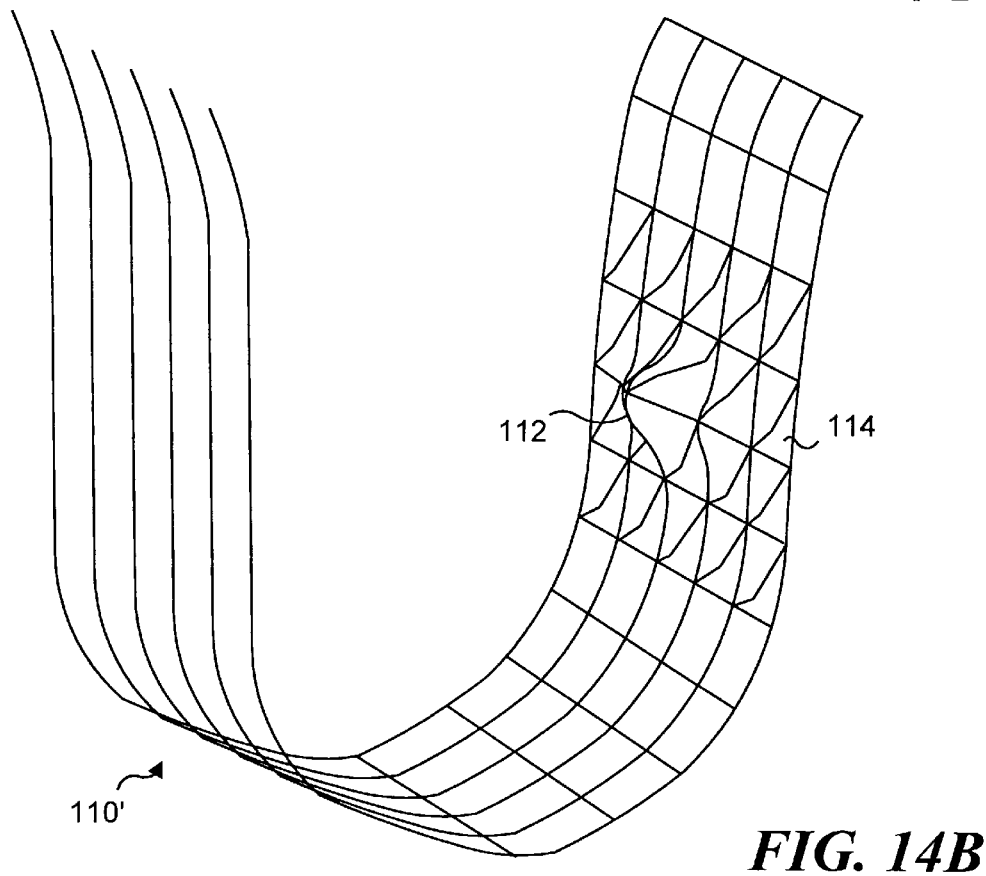

FIGS. 14A and 14B illustrate why it is necessary for the loss function to have a smoothness penalty term, to prevent the surface being fitted from being unduly influenced by small perturbations in the input data points. In the preferred embodiment of the present invention, the smoothness penalty term is the surface area. FIG. 14A shows sample traced borders 110 of the left ventricular endocardium from multiple parallel imaging planes. One of the borders has a small perturbation 112, which may represent noise in the image or variability in tracing. In the fitting procedure, the areas of the faces are measured, and the sum of the areas is minimized to prevent mesh triangles 114 from being pulled and stretched by perturbation 112 in the input data, as is shown in FIG. 14B. By minimizing squared areas of the triangles, the smoothness penalty counteracts the tendency of the perturbation to pull out and elongate the nearby triangles, thus minimizing errors that might be caused by noise and other perturbations.

Figure 15:
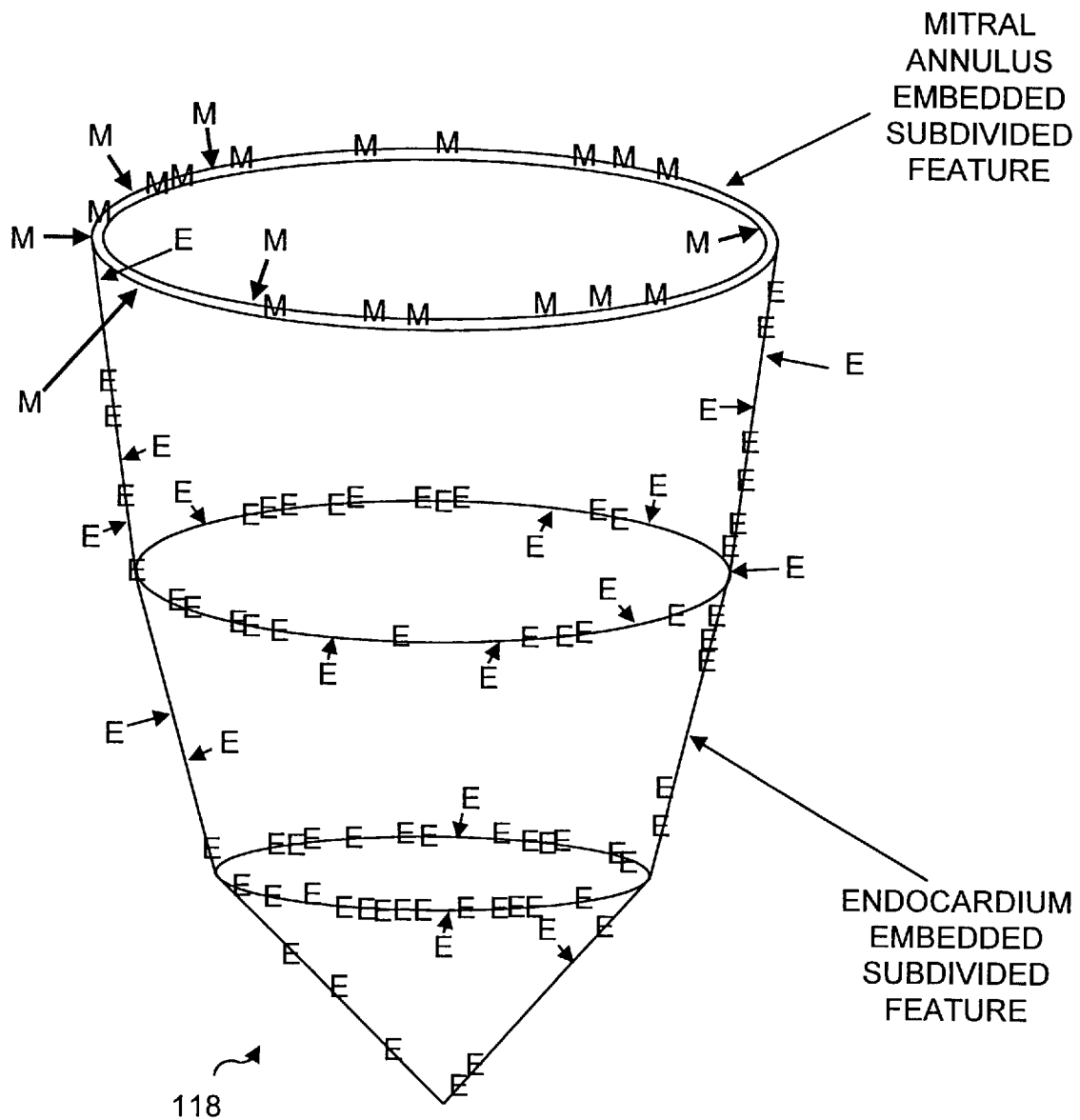
FIG. 15 schematically illustrates how a residual energy term in a loss function is applied in fitting the abstract control mesh to the data, taking into account the correspondence between the data and surface features.

The other term in the loss function that is optimized in the fitting procedure is residual energy, which is calculated by measuring the distance from each data point to its projection onto the corresponding embedded subdivided feature, as illustrated in FIG. 15. In this Figure, the top ellipse represents the mitral annulus subdivided feature, and the remainder of the surface represents the endocardium feature. The endocardium points projecting on the endocardium embedded subdivided feature are indicated by each occurrence of the letter "E" in the drawing. Similarly, the mitral annulus data points projecting only on the mitral annulus embedded subdivided feature are indicated at each occurrence of the letter "M." The length of each arrow projected onto the feature from its corresponding point is indicative of the residual energy contribution of that point.

Figure 16:
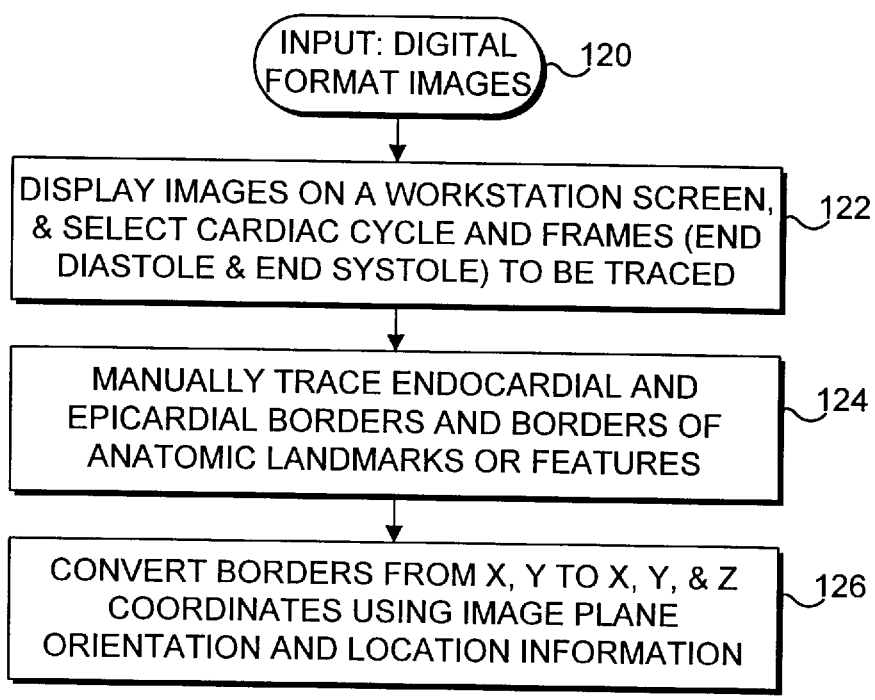
FIG. 16 is a flow chart illustrating the logical steps employed in tracing a border from a displayed image of a portion of the heart.

The process for analyzing cardiac images to develop the input data set of points is shown in FIG. 16. If acquired in analog format, the images are first converted to digital format, as indicated in a block 120, using an A–D converter. In a block 122, the digital format images are then displayed on a computer workstation in cine loop through the entire cardiac cycle. The end diastolic frame is selected as the frame occurring on the R-wave of the electrocardiogram, or as the frame in which the left ventricular chamber area appears to be of maximal size. The end systolic frame is selected as the frame of minimal left ventricular chamber area. Borders of the left ventricle and of associated anatomic landmarks are then manually traced in a block 124. Using knowledge of the position and orientation of the imaging planes in three-dimensional space, the x, y coordinates of the border tracings are converted to x, y, and z coordinates in a block 126. These x, y, and z coordinates comprise the data set of points that are used in the process.

Figure 17:
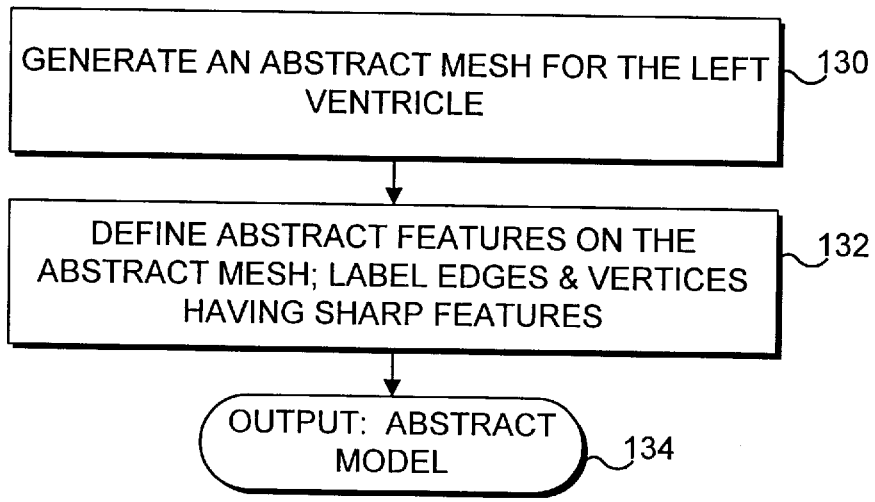
FIG. 17 is a flow chart that identifies the steps used to generate an abstract control mesh of the left ventricle.

FIG. 17 is a flow chart that illustrates the steps employed for generating an abstract model of the left ventricle. First an abstract control mesh for the left ventricle is generated in a block 130. This procedure is typically performed using a CAD program or 3D viewer. Next, in a block 132, abstract features are defined as feature sub complexes on the abstract mesh. It is this step that relates the abstract control mesh to the anatomical features or landmarks that are known to exist in virtually every left ventricle, thereby defining an abstract model of a specific type of object. The vertices and edges that correspond to sharp features are labeled as such. The prior art does not disclose the steps implemented in block 132 and the steps are very important, because they permit the reconstruction of the left ventricular surface using a relatively limited and low quality input data set compared to that used by Hoppe et al. Although the abstract control mesh does not have a three-dimensional shape due to its lack of coordinates, in practice, it is useful to arbitrarily assign x, y, and z coordinates to the vertices, so that the shape of the abstract mesh and the location of abstract features can be checked during the design process. This procedure produces an abstract model, as indicated in a block 134.

Figure 18:
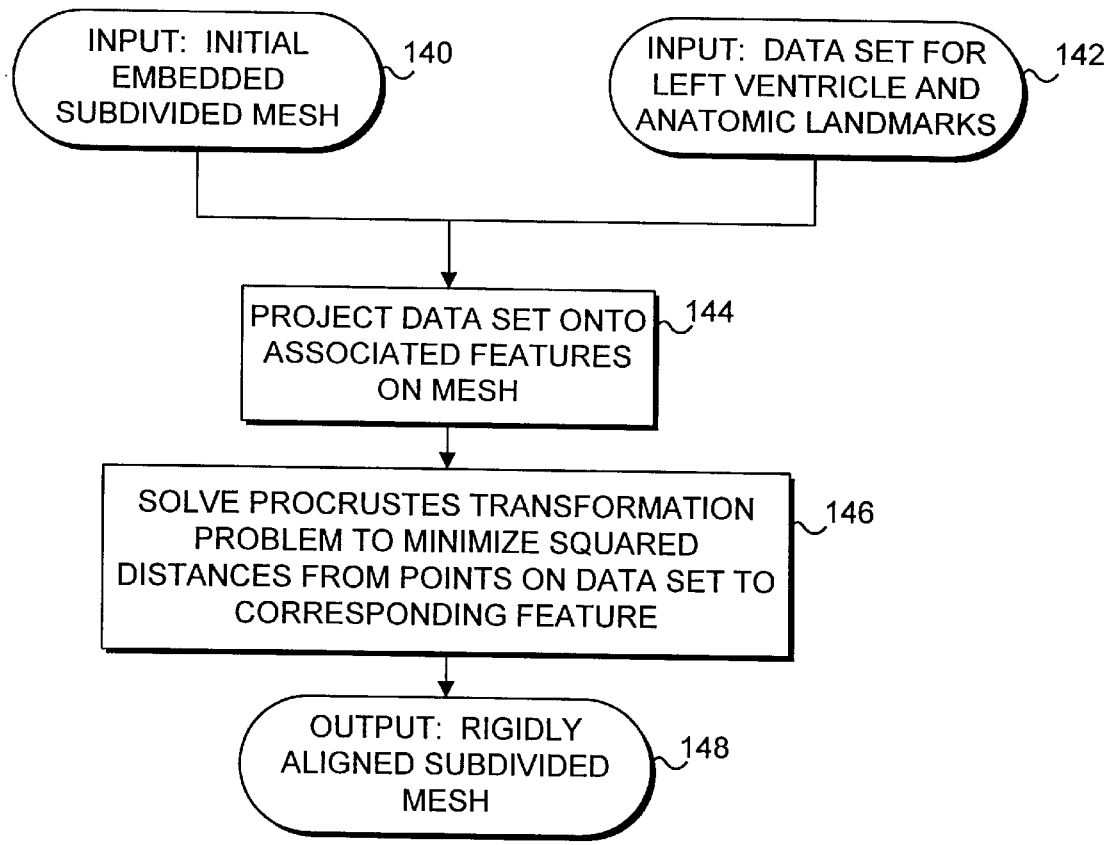
FIG. 18 is a flow chart that shows the steps followed to rigidly align an initial embedded subdivided mesh with anatomic landmarks of input data.

In FIG. 18, a flow chart shows the details of block 22 (FIG. 1) for rigidly aligning the embedded subdivision control mesh to the points of the data sets. As noted in a block 140, the initial embedded subdivided mesh is input. Also input, as indicated in a block 142, are the data set of points that define the left ventricle of the patient and the locations of the anatomic landmarks in the patient's heart. The data sets are first projected onto the associated features on the mesh in a block 144. In a block 146, the abstract control mesh is rotated, translated, and scaled as necessary to fit the input data in a process that is referred to as a "Procrustes transformation problem solution." It should be noted that in any optimization problem, the choice of where to start minimizing error is important, because it determines not only how long it takes to converge to an acceptable solution, but also whether the solution found represents a global minimum error, or at least a reasonable local minimum error. In the preferred embodiment, the iterative closest point algorithm of P. J. Besl and H. D. McKay, which is described in "A method for registration of 3-D shape" (IEEE PAMI, 1992) is used to determine a translation and rotation that best align the initial embedded subdivided mesh with the input data for the patient, taking into account the matching of data sets to features. The result of this procedure is the rigidly aligned subdivided mesh, as indicated in a block 148.

Figure 19:
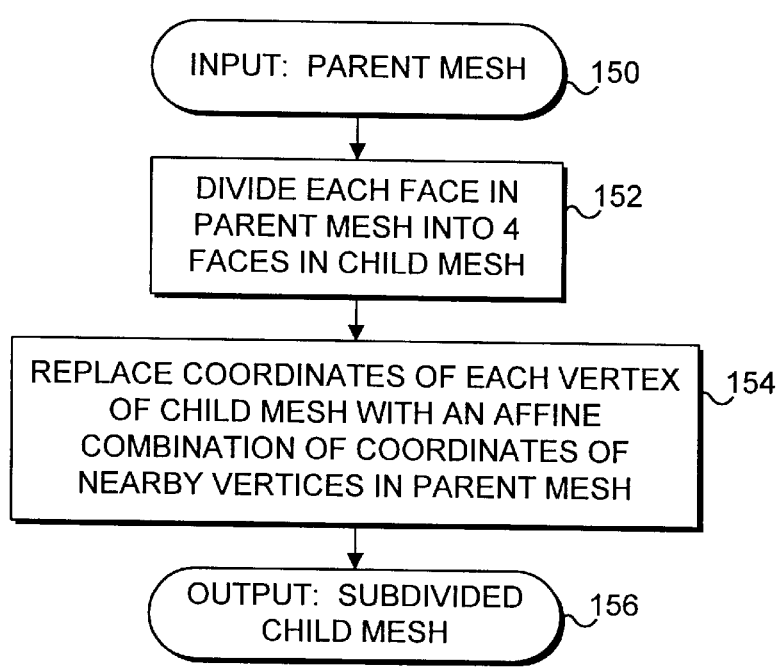
FIG. 19 is a flow chart illustrating the steps in subdividing the abstract control mesh.

FIG. 19 is a flow chart illustrating the steps applied in subdividing a mesh, i.e., the step in block 20 of FIG. 1. An initial input to the process in a block 150 is the embedded control mesh, which corresponds to the first parent mesh. Each triangular face of the parent mesh is divided into four smaller triangular faces of a child mesh in a block 152. As noted in a block 154, an affine combination of the coordinates of nearby vertices in the parent mesh is employed to determine the coordinates of each vertex of the child mesh. The process yields a subdivided child mesh, as indicated in a block 156. (Note that FIG. 12 provides a simple example showing how the affine combination of the vertices (A, B, & C), i.e., a subdivision of the vector connecting these vertices for one face of a parent mesh, produces a child having four faces.)

Figure 20:
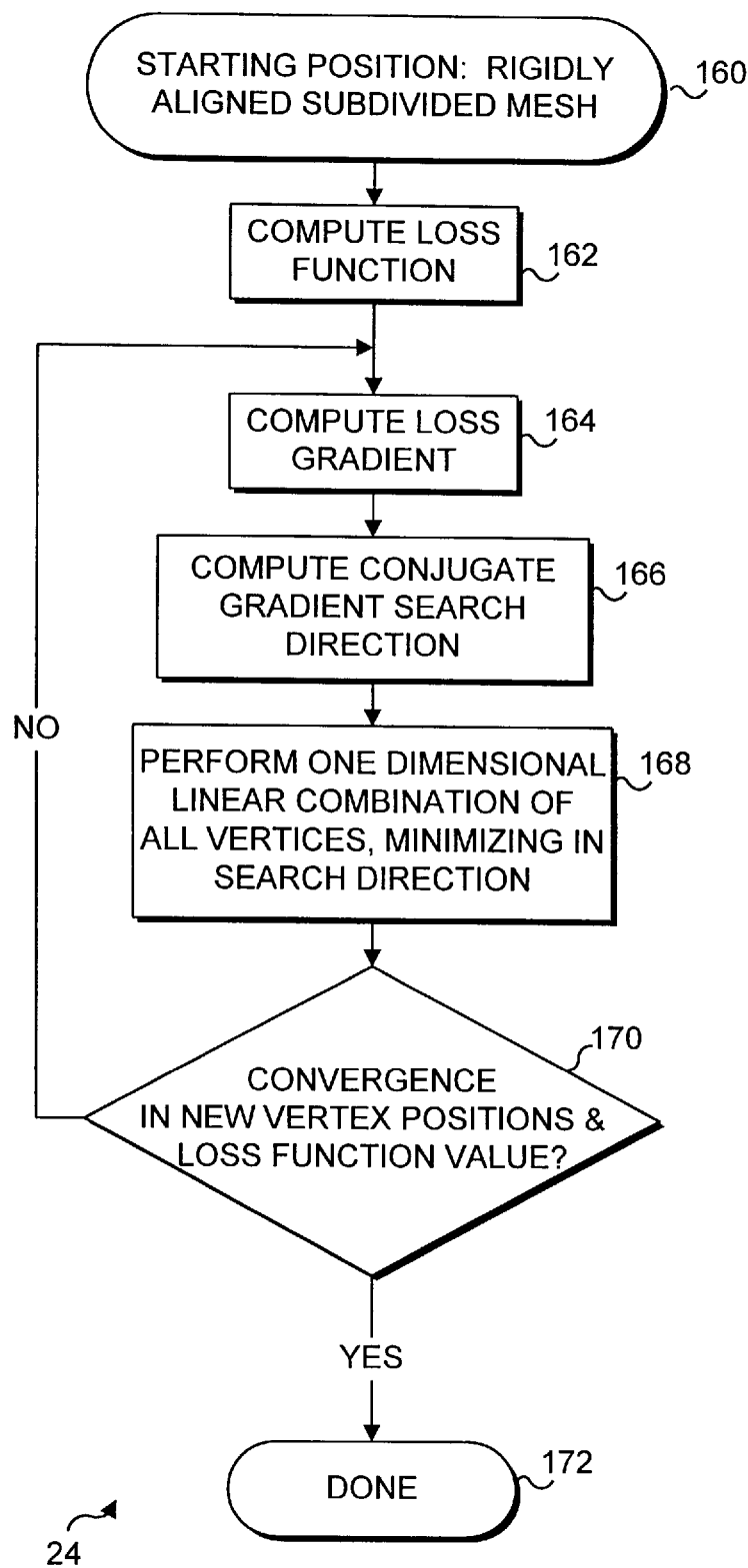
FIG. 20 is a flow chart that identifies the steps used to fit the embedded subdivided mesh to points on the input data.

In FIG. 20, a flow chart provides more details of block 24 (FIG. 1), which provides for fitting the embedded subdivided mesh to the input data set points. A block 160 indicates that the starting position for the procedure is the rigidly aligned subdivided mesh produced above. In a block 162, a loss function for the rigidly aligned subdivided mesh, compared to the input data set points, is computed. As noted above, the loss function includes the residual energy, which is equal to the sum of each of the projected distances from the points to their corresponding features squared, and the smoothness penalty. Then, in a block 164, a loss gradient is calculated, which shows the direction of greatest increase in the loss function, and which is the derivative of the loss function with respect to changes in position of the vertices of the control mesh. The conjugate gradient search direction is then computed in a block 166 to determine the direction for loss function minimization. A one-dimensional minimization is performed in the search direction in a block 168. This step produces a new set of vertex positions, with a new loss function value. The result of the minimization is tested for convergence in a block 170. If the convergence criteria are met, then the fitting is finished, as indicated in a block 172. If the convergence criteria are not met, then the process loops back to block 164, to again determine the loss gradient, repeating the steps that follow block 164. It should be noted that Newton methods or other alternative approaches using higher order derivatives of the loss function might be applied in this process instead of using the conjugate gradient.

While the preferred embodiment of the invention has been illustrated and described in connection with preferred embodiments of the invention, it will be appreciated that various changes can be made therein without departing from the spirit and scope of the invention. Accordingly, the scope of the invention should be determined entirely by reference to the claims that follow and should not be limited to the above description.

The invention in which an exclusive right is claimed is defined by the following:

1. A method for using a computer for reconstructing a surface of a three-dimensional object, comprising the steps of:
   (a) providing data derived from imaging the object, said data including at least one labeled feature of the object, each such labeled feature that is included in said data corresponding to a specific portion of the object;
   (b) creating an abstract model of the object that includes at least one abstract feature, each such abstract feature corresponding to a labeled feature in the data for the object, said abstract model comprising an abstract control mesh;
   (c) assigning coordinates to the control mesh to produce an embedded mesh that includes embedded features corresponding to the abstract features, said embedded mesh comprising a plurality of polygons;
   (d) aligning the embedded mesh to the data for the object, so that each embedded feature is generally aligned with the corresponding labeled feature in the data; and
   (e) optimizing a fit of the embedded mesh to the data for the object and of each embedded feature with the corresponding labeled feature in the data to produce a reconstructed surface of the object.

2. The method of claim 1, further comprising the step of subdividing the embedded mesh a plurality of times prior to aligning it to the data for the object, producing an embedded subdivided mesh.

3. The method of claim 1, wherein the step of aligning comprises the steps of rotating, translating, and scaling the embedded mesh so as to minimize a distance between each labeled feature and a corresponding embedded feature.

4. The method of claim 1, wherein the step of optimizing the fit of the embedded mesh comprises the steps of computing a loss function that combines a goodness of fit with a surface quality, wherein the goodness of fit is measured by determining a distance between each data point and its projection on a corresponding surface feature; and, shifting vertices comprising the embedded mesh so as to minimize the loss function.

5. The method of claim 1, wherein the step of providing the data comprises the steps of imaging the object to produce image data; and, tracing borders and each of the labeled features in the image data.

6. The method of claim 1, wherein the object comprises an organ in a patient's body, and each labeled feature comprises an anatomical part of the organ.

7. The method of claim 1, wherein the step of aligning comprises the step of minimizing a sum of squared distances from all points on the labeled features in the data to their corresponding projections on corresponding surface features.

8. The method of claim 1, wherein the abstract model has edges and vertices defined as being sharp.

9. A method for producing a reconstructed surface of an organ, comprising the steps of:

(a) imaging the organ to produce a plurality of images;

(b) producing a set of points defining a border of the organ and anatomical features of the organ, using the plurality of images;

(c) producing an abstract model generally designed for the type of organ imaged in step (a), said abstract model including an abstract control mesh and identifying abstract features corresponding to the anatomical features of the organ;

(d) assigning coordinates to the abstract control mesh to produce an embedded mesh that includes embedded features and comprises a plurality of polygons;

(e) rigidly aligning the embedded mesh to the set of points defining the border so that the embedded features are generally aligned with the anatomical features of the defined by the set of points; and (f) optimizing a fit of the embedded mesh to the set of points by adjusting vertices of the embedded mesh to better match the embedded features with the anatomical features, yielding the reconstructed surface of the organ.

10. The method of claim 9, further comprising the step of subdividing the embedded mesh to produce an embedded subdivided mesh having a greater number of faces than the embedded mesh, said embedded subdivided mesh replacing the embedded mesh as referenced in steps (e) and (f).

11. The method of claim 10, wherein the embedded subdivided mesh includes embedded subdivided features having a greater number of faces than embedded control features, said embedded subdivided features replacing the embedded features in steps (e) and (f).

12. The method of claim 10, wherein the step of subdividing comprises the step of applying an affine combination of coordinates of adjacent vertices in the embedded mesh to produce the embedded subdivided mesh.

13. The method of claim 9, wherein the organ comprises a left ventricle of a heart.

14. The method of claim 9, wherein the abstract control mesh represents a substantial range of sizes and shapes of the organ that might be found in corresponding organs of other people.

15. The method of claim 9, wherein the step of rigidly aligning comprises the step of rotating, translating, and scaling the embedded mesh to align the embedded features with the anatomical features, one of the embedded features comprising a border of the organ.

16. The method of claim 9, wherein the abstract model includes data that define a sharp feature of edges and vertices comprising the abstract model.

17. The method of claim 9, wherein the step of optimizing comprises the steps of:

(a) determining a value of a loss function for a fit of the embedded mesh to the set of points; and (b) performing a minimization of the loss function.

18. A system for reconstructing a surface of an object, comprising:

(a) an imaging system for producing images of the object;

(b) a memory for storing:

(i) data defining a border of the object derived from the images and a labeled feature of the object;

(ii) an embedded mesh that includes an embedded feature corresponding to the labeled feature in the data, and which comprises a plurality of polygons; and (iii) machine instructions that define steps for processing the data derived from the images using the embedded mesh; and (c) a processor that is coupled to the memory, said processor executing the machine instructions, causing the processor to:

(i) rigidly align the embedded mesh to the data, including aligning the embedded feature with the labeled feature in the data; and (ii) optimally fitting the embedded mesh to the data by separately adjusting vertices of the embedded mesh to minimize an error in fitting the embedded mesh to the data and fitting the embedded feature to the labeled feature to reconstruct the surface of the object.

19. The system of claim 18, wherein the embedded mesh is derived by the processor, in accord with the machine instructions, from an initial embedded mesh, by subdividing the initial embedded mesh.

20. The system of claim 19, wherein the initial embedded mesh is generated by the processor, in accord with the machine instructions, by assigning coordinates to an abstract control mesh that includes an abstract feature, assignment of coordinates to the abstract control mesh producing the embedded feature from the abstract feature, said abstract control mesh and abstract feature comprising an abstract model for the object.

21. The system of claim 18, wherein the machine instructions cause the processor to optimally fit the embedded mesh to the data by minimizing a loss function that is indicative of the differences between the embedded mesh and the data.

* * * * *